United States Patent
Saito et al.

(10) Patent No.: US 8,507,122 B2
(45) Date of Patent: Aug. 13, 2013

(54) POWER SUPPLY DEVICE INCLUDING A PLURALITY OF BATTERY CELLS ARRANGED SIDE BY SIDE

(75) Inventors: Masao Saito, Kasai (JP); Tomokazu Takashina, Kasai (JP); Tsuyoshi Takahashi, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 246 days.

(21) Appl. No.: 12/914,251

(22) Filed: Oct. 28, 2010

(65) Prior Publication Data
US 2011/0104548 A1 May 5, 2011

(30) Foreign Application Priority Data
Oct. 30, 2009 (JP) .................................. 2009-250030

(51) Int. Cl.
*H01M 10/50* (2006.01)
(52) U.S. Cl.
USPC ............................. 429/120; 429/152; 429/161
(58) Field of Classification Search
None
See application file for complete search history.

(56) References Cited

U.S. PATENT DOCUMENTS

| | | | |
|---|---|---|---|
| 6,689,510 B1 | 2/2004 | Gow et al. | |
| 7,547,487 B1 | 6/2009 | Smith et al. | |
| 2005/0089751 A1 | 4/2005 | Oogami et al. | |
| 2006/0090492 A1 | 5/2006 | Ahn et al. | |
| 2006/0093901 A1 | 5/2006 | Lee et al. | |
| 2006/0115720 A1* | 6/2006 | Kim | 429/156 |
| 2007/0026305 A1* | 2/2007 | Jeon et al. | 429/159 |
| 2007/0037051 A1 | 2/2007 | Kim et al. | |
| 2008/0160395 A1* | 7/2008 | Okada et al. | 429/99 |
| 2009/0111010 A1* | 4/2009 | Okada et al. | 429/120 |

FOREIGN PATENT DOCUMENTS

| | | |
|---|---|---|
| EP | 1 523 051 | 4/2005 |
| EP | 1 753 058 | 2/2007 |
| JP | 2007-250515 | 9/2007 |
| JP | 2007-299544 | 11/2007 |
| WO | 00/11730 | 3/2000 |
| WO | 2005/119813 | 12/2005 |

OTHER PUBLICATIONS

European Search Report (in English language) issued Jan. 24, 2011 in corresponding European Patent Application No. 10 01 4158.

* cited by examiner

*Primary Examiner* — Cynthia Walls
(74) *Attorney, Agent, or Firm* — Wenderoth, Lind & Ponack, L.L.P.

(57) ABSTRACT

A power supply device includes rectangular battery cells 1, resin separators 2, end spacers 17, thick metal end plates 10, and coupling members 11. The separator 2 is inserted between the cells 1 to insulate adjacent cells 1 from each other, and in thermal contact with the cells 1. The end spacers 17 cover end battery cells 1 on the opposed end surfaces of a battery block composed of the cells 1 and the separators 2 alternately arranged. The end plates 10 cover the surfaces of the end spacers 17. The coupling members 11 couple the end plates 10 to each other. The separators 2 form gaps 4 for flowing air along the surfaces of the cells 1 in contact with the separators 2. The end spacers 17 have hollow layers 18 on their surfaces in contact with the cells 1, and define closed chambers.

16 Claims, 25 Drawing Sheets

FIG. 18 (a) (b)

PRIOR ART

POWER SUPPLY DEVICE INCLUDING A PLURALITY OF BATTERY CELLS ARRANGED SIDE BY SIDE

BACKGROUND OF THE INVENTION

1. Field of the Invention

The present invention relates to a power supply device that includes a plurality of battery cells arranged side by side with separators being interposed between the battery cells, and a vehicle using the power supply device.

2. Description of the Related Art

A power supply device or a battery system has been developed that includes a number of battery cells arranged side by side, and forcedly blows air to cooling gaps between the battery cells. This type of power supply device or battery system is used for vehicles such as hybrid car and electric vehicle. Since this type of power supply device employs a number of battery cells, the battery cells will have a temperature difference among them. In particular, in the case where the number of the battery cells arranged side by side is large, it is difficult to cool all the battery cells to even temperatures, in other words, to temperatures that fall within a small range. It is very important for a vehicle battery system including a number of battery cells arranged side by side to reduce the temperature difference among battery cells to be as small as possible. The reason is that temperature difference may cause uneven remaining capacities of the battery cells, and as a result may deteriorate the life of some of the battery cells. The efficiency of batteries in charging/discharging operation varies in accordance with their temperatures. For this reason, in the case where batteries have temperature difference, even if the batteries are charged/discharged at the same current, the batteries will have different remaining capacities. If the batteries have different remaining capacities, when a battery is likely to have a larger remaining capacity, the battery is likely to be overcharged. On the other hand, when another battery is likely to have a smaller remaining capacity, the battery is likely to be over-discharged. If a battery is overcharged or over-discharged, the battery will deteriorate faster. As a result, the life of the vehicle battery system will be reduced. In particular, in the case of the vehicle battery system for hybrid car, plug-in hybrid car, electric vehicle and the like, since a number of side-by-side arranged batteries are provided to be charged/discharged at a large amount of current, its manufacturing cost will be very expensive. For this reason, it is important for the vehicle battery system to increase its life. In particular, as the number of batteries used in the vehicle battery system increases, its manufacturing cost increases. Also, from this viewpoint, it is required to increase the life of the vehicle battery system. Contrary to this, as the number of side-by-side arranged batteries increases, temperature difference in the vehicle battery system will increase, which in turn may reduce the life of vehicle battery system.

A vehicle battery system has been developed that includes a plurality of battery cells arranged side by side, and forcedly blows cooling gas to cooling space between the battery cells (Japanese Patent Laid-Open Publication 2007-250515).

In the vehicle battery system disclosed in JP 2007-250515 A, as shown in a cross-sectional view of FIG. 25, cooling gaps 103 are formed between battery cells 101 of a battery block 110, and inlet and outlet ducts 106 and 107 are provided on the both sides of the battery block 110. The vehicle battery system forcedly blows cooling air through the inlet duct 106 to the cooling gap 103 so that the cooling gas is discharged through the outlet duct 107. Thus, the battery cell 101 is cooled.

However, in the system in which the battery cells are cooled one after another by the cooling air, although a battery cell located closer to the inlet duct is cooled well by cold cooling air that just arrives at this battery cell, the cooling air is forcedly moved and is gradually heated by repeated heat exchange between the cooling air and battery cells. For this reason, there is a problem in that, when battery cells are arranged side by side in the longitudinal direction of a cooling duct, temperature difference will arise due to the positional difference among the battery cells. Such temperature difference among the battery cells may cause property deterioration difference of life difference among the battery cells. In particular, the output of the battery system is restricted in accordance with a battery cell having the lowest temperature. For this reason, in order to maximize the performance of the battery system, ideally, it is desired to bring $\Delta T$ (the difference between the highest and lowest battery temperatures) to zero.

The present invention is devised to solve the above problem. It is a main object of the present invention to provide a power supply device that can reduce temperature difference among battery cells and maximize the performance of the battery cells.

SUMMARY OF THE INVENTION

To achieve the above object, a power supply device according to a first aspect of the present invention includes a plurality of rectangular battery cells 1, separators 2, a pair of end spacers 17, a pair of metal end plates 10, and coupling members 11. The separators 2 are made of resin. Each of the separators 2 is interposed between the battery cells 1, and in thermal contact with the surfaces of adjacent battery cells 1 among the plurality of battery cells 1. Each of the separators 2 electrically insulates the adjacent battery cells 1 from each other. The pair of end spacers 17 cover end battery cells 1 among the plurality of battery cells 1 located on the end sides of a battery block. The battery block is composed of the plurality of battery cells 1 and the separators 2 that are alternately arranged side by side. The pair of metal end plates 10 cover surfaces of the end spacers 17 and are thicker than the end spacers 17. The coupling members 11 couple the pair of end plates 10 to each other. Each of the separators 2 forms cooling gaps 4 on the sides in contact with the adjacent battery cells 1. Cooling gas flows through the cooling gaps. Each of the end spacers 17 forms at least one hollow thermally-insulating layer 18 that is located on a side of the end spacer 17 in contact with the end battery cell 1 whereby defining at least one closed chamber. In this power supply device, since the end plates are made of metal, mechanical coupling force by the end plates can be improved, and the thermal conductivity of the end plates can be high. In addition, thermally-insulating layers, which define the closed chamber, can prevent that a battery cell that faces the end plate is cooled at higher cooling performance than other battery cells. Thus, it is possible to improve the mechanical strength of the power supply device, and to evenly cool the battery cells.

In a power supply device according to a second aspect of the present invention, the cooling gaps 4 can be formed by forming the separator 2 in a rectangular or trapezoidal wave shape in section and opening the ends of hollow parts that are defined by the rectangular or trapezoidal wave shape, and the at least one thermally-insulating layers 18 can be formed by forming the end spacer 17 in a rectangular or trapezoidal wave shape in section and closing the ends of at least one hollow part that is defined by the rectangular or trapezoidal wave shape. In this power supply device, the separator and the end spacer can have substantially common shape. The end spacer can be formed only by closing the ends of the cooling gap. Therefore, the separator and the end spacer can be manufactured at low cost.

In a power supply device according to a third aspect of the present invention, the at least one thermally-insulating layer 18 can be formed by closing the ends of at least one of the cooling gaps 4. In this power supply device, a thermally-insulating layer with the same width as the cooling gap can be easily formed. Therefore, the end spacer can be manufactured at low cost.

In a power supply device according to a fourth aspect of the present invention, the at least one thermally-insulating layer 18 can be composed of chamber parts that are defined by dividing the at least one closed chamber by ribs. In this power supply device, the rib can improve the strength of the end spacer, and thermally-insulating effect by holding air in the plurality of divided closed chamber parts.

In a power supply device according to a fifth aspect of the present invention, the ribs can be formed in continuous V shapes in section. In this power supply device, the ribs can be simply constructed, and can improve the flexural strength of the end spacer.

In a power supply device according to a sixth aspect of the present invention, the end spacers 17 can include the cooling gaps 4. The number of the cooling gaps 4 in each of the separators 2 is greater than each of the end spacers 17. Alternatively, the total cross-sectional area of flow paths of the cooling gaps 4 in each of the separators 2 can be greater than each of the end spacers 17. In this power supply device, a battery cell that faces the end spacer can be cooled, but the flow rate of cooling gas in this cell is suppressed as compared with other battery cells. Therefore, the cooling performance balance can be achieved.

In a power supply device according to a seventh aspect of the present invention, each of the end spacers 17 can include the cooling gap 4 in substantially the center of the end spacer 17 in a height direction of the battery cell 1. The thermally-insulating layers 18 can be arranged on both sides of this cooling gap 4. In this power supply device, since a battery cell on the end side can be cooled from substantially its center, this battery cell can be cooled evenly in the height direction of the battery cell.

In a power supply device according to an eighth aspect of the present invention, separators 2 among the separators 2 that face the end spacers 17 can have thermally-insulating layers 18. In this power supply device, since the thermally-insulating layer is also formed on a battery cell that is considered to be cooled more strongly next to a battery cell on the end side.

In a power supply device according to a ninth aspect of the present invention, the total cross-sectional area of the cooling gaps 9 can be the smallest on the end surfaces of the battery block, and gradually increases toward the inside of the battery block. In this power supply device, the total cross-sectional area of the cooling gaps 9 of battery cells gets smaller as closer to a battery cell on the end side, which is likely to be cooled strongly. Thus, cooling performance is suppressed as closer to the battery cell on the end side. Therefore, it is possible to reduce temperature difference between a battery cell on the inside and the battery cell on the end side in the battery block.

A power supply device according to a tenth aspect of the present invention can further include a duct that can be connected to a blower mechanism 9 to forcedly blowing cooling gas into the cooling gaps 4. In this power supply device, cooling gas can be reliably provided to the cooling gaps between separators so that the battery cells are cooled.

In a power supply device according to an eleventh aspect of the present invention, the coupling members 11 can be secured by screws. Since the end plates are made of metal, the end plates can have enough strength for receiving screws so that the coupling members can be secured by the screws.

The above and further objects of the present invention as well as the features thereof will become more apparent from the following detailed description to be made in conjunction with the accompanying drawings.

DETAILED DESCRIPTION OF THE EMBODIMENT(S)

Figure 1:
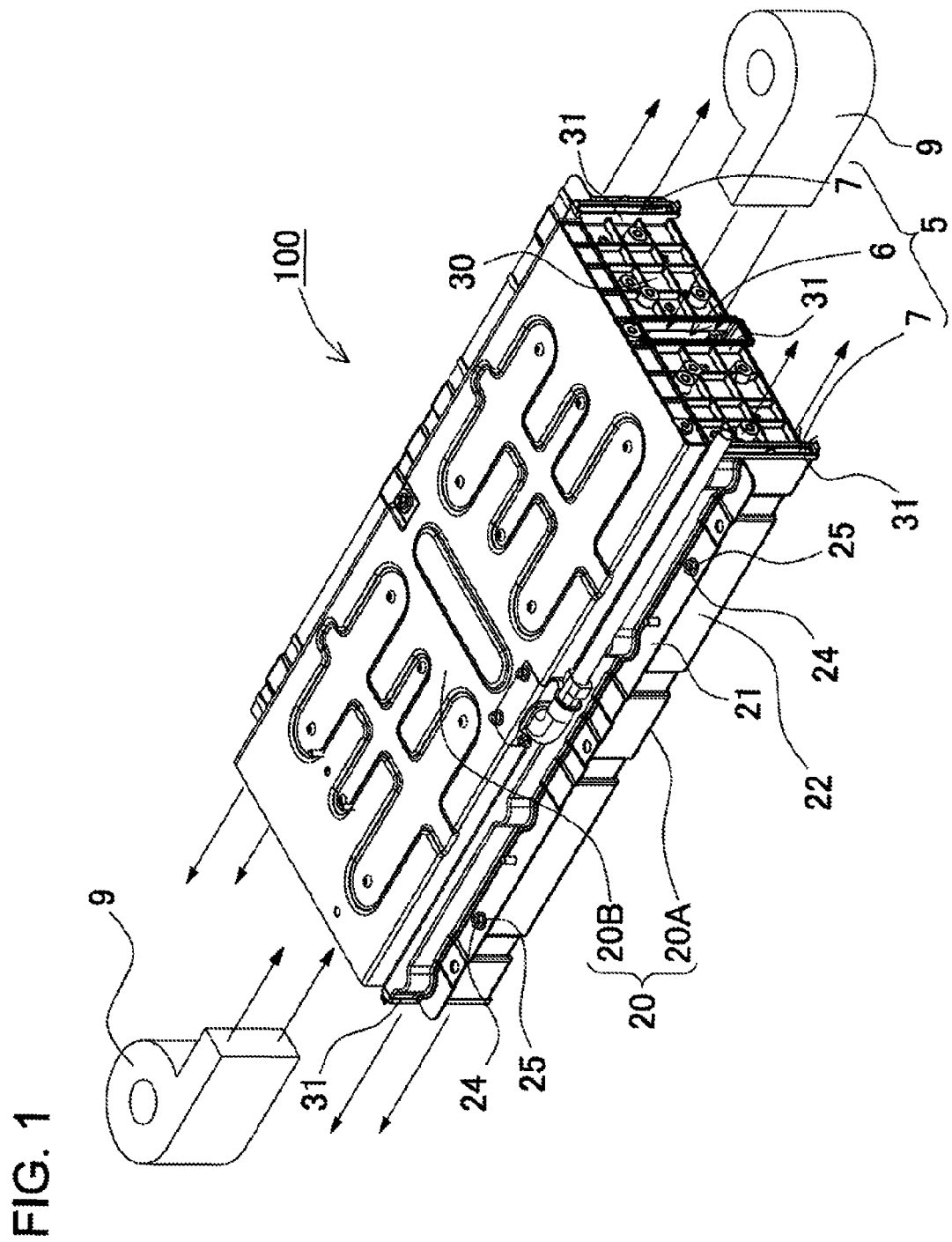
FIG. 1 is a perspective view of a battery system according to an embodiment of the present invention.
Figure 2:
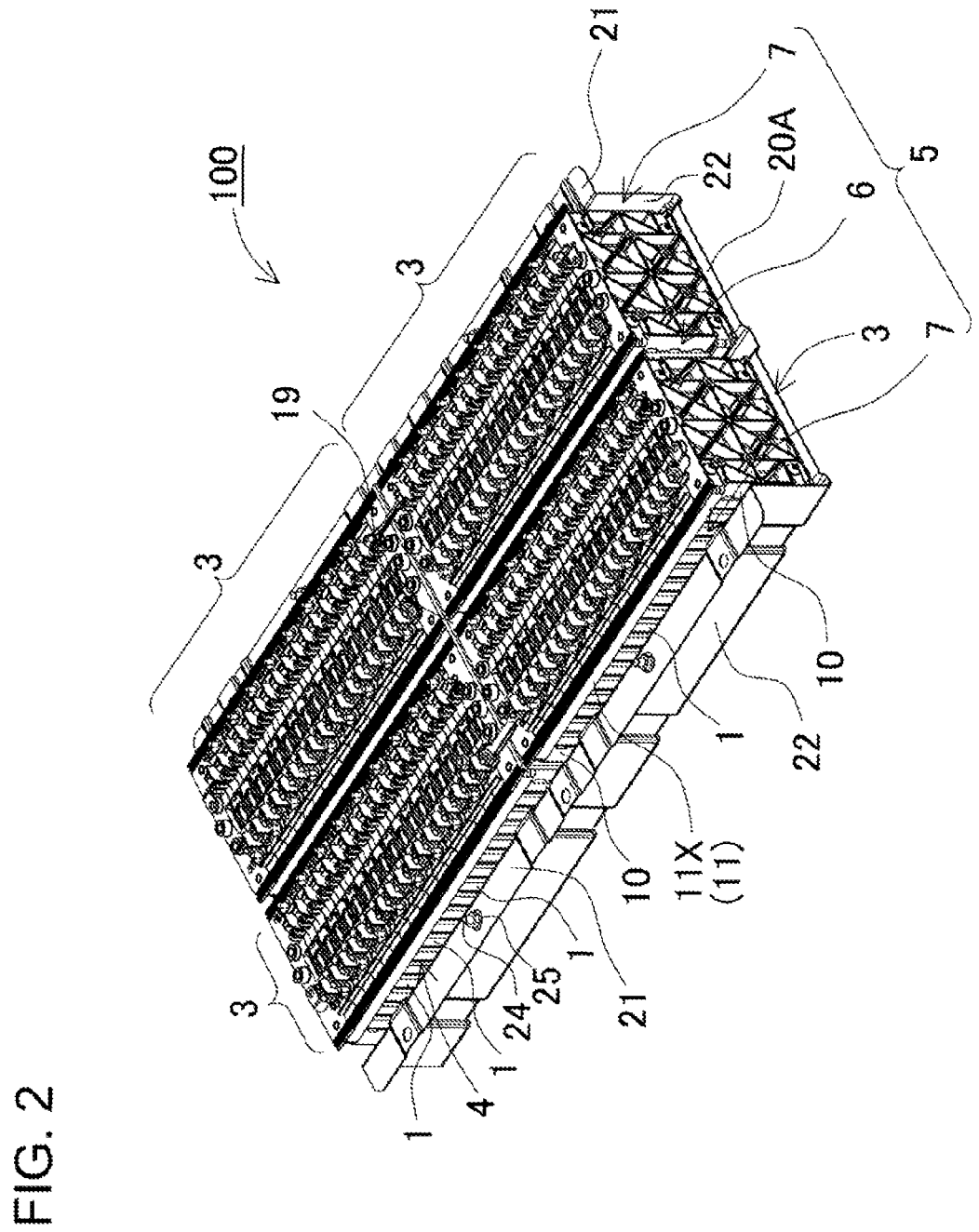
FIG. 2 is a perspective view showing the internal structure of the battery system shown in FIG. 1.

The following description will describe embodiments according to the present invention with reference to the drawings. It should be appreciated, however, that the embodiments described below are illustrations of a power supply device and a method for controlling charging/discharging operation of a power supply device to give a concrete form to technical ideas of the invention, and a power supply device and a method for controlling charging/discharging operation of a power supply device of the invention are not specifically limited to description below. Furthermore, it should be appreciated that the members shown in claims attached hereto are not specifically limited to members in the embodiments. Unless otherwise specified, any dimensions, materials, shapes and relative arrangements of the members described in the embodiments are given as an example and not as a limitation. Additionally, the sizes and the positional relationships of the members in each of drawings are occasionally shown larger exaggeratingly for ease of explanation. Members same as or similar to those of this invention are attached with the same designation and the same reference numerals, and their description is omitted. In addition, a plurality of structural elements of the present invention may be configured as a single part that serves the purpose of a plurality of elements, on the other hand, a single structural element may be configured as a plurality of parts that serve the purpose of a single element. Also, the description of some of examples or embodiments may be applied to other examples, embodiments or the like.

Figure 18:
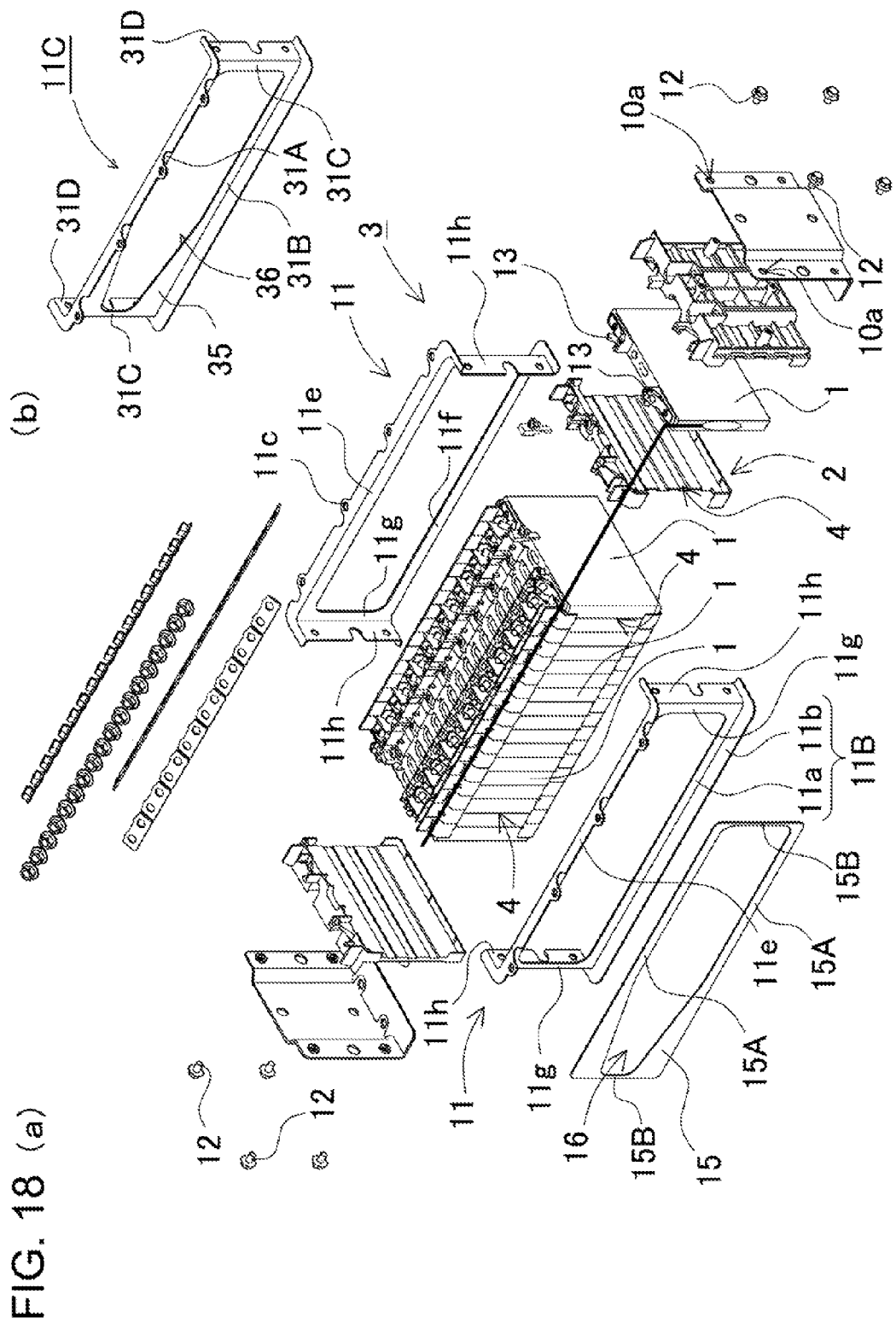
FIG. 18 is a perspective view showing bind bars according to a modified embodiment.
Figure 19:
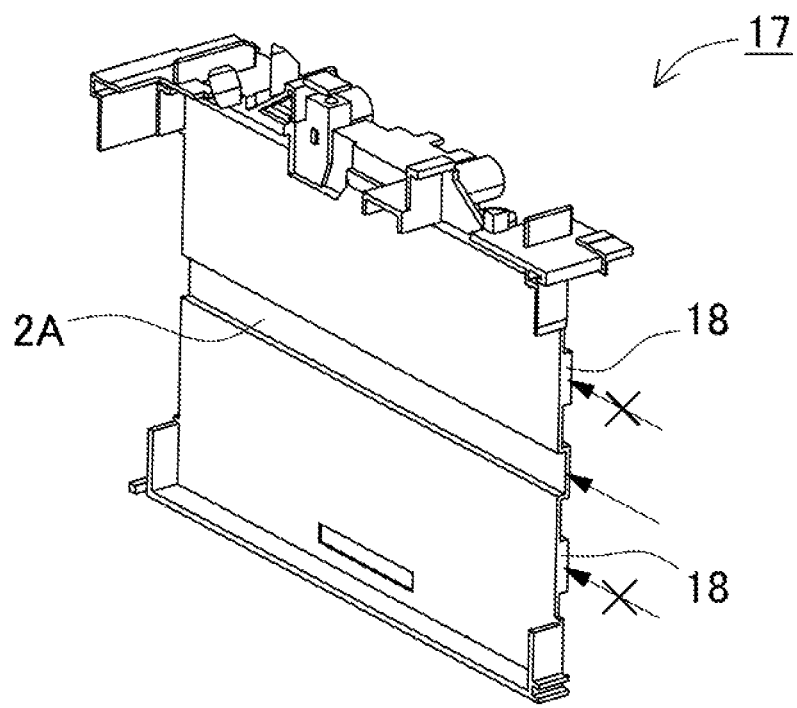
FIG. 19 is a perspective view showing an end spacer.
Figure 20:
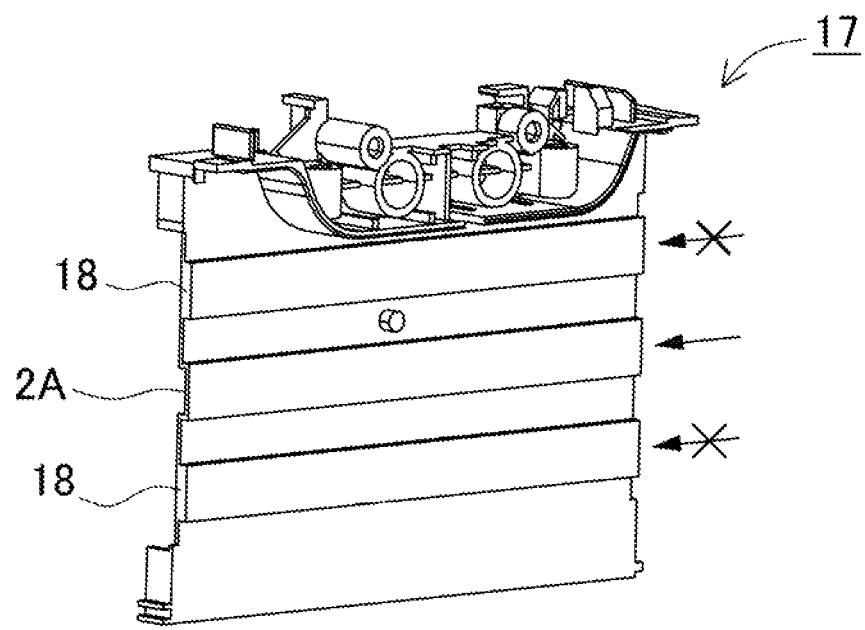
FIG. 20 is a perspective view showing the end spacer shown in FIG. 19 as viewed from the back side.
Figure 21:
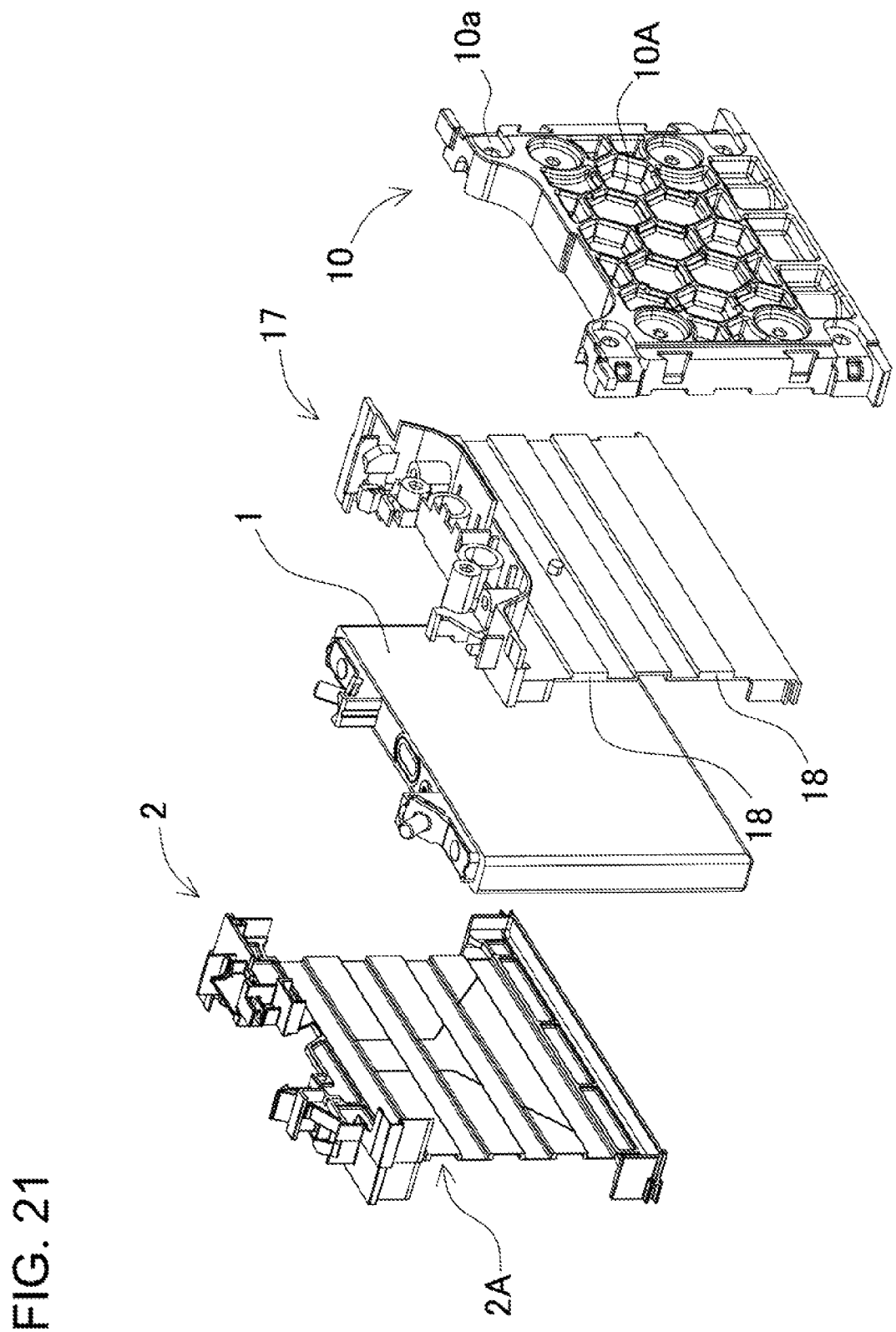
FIG. 21 is a perspective view showing the end spacer and an end plate to be engaged with the end spacer.
Figure 22:
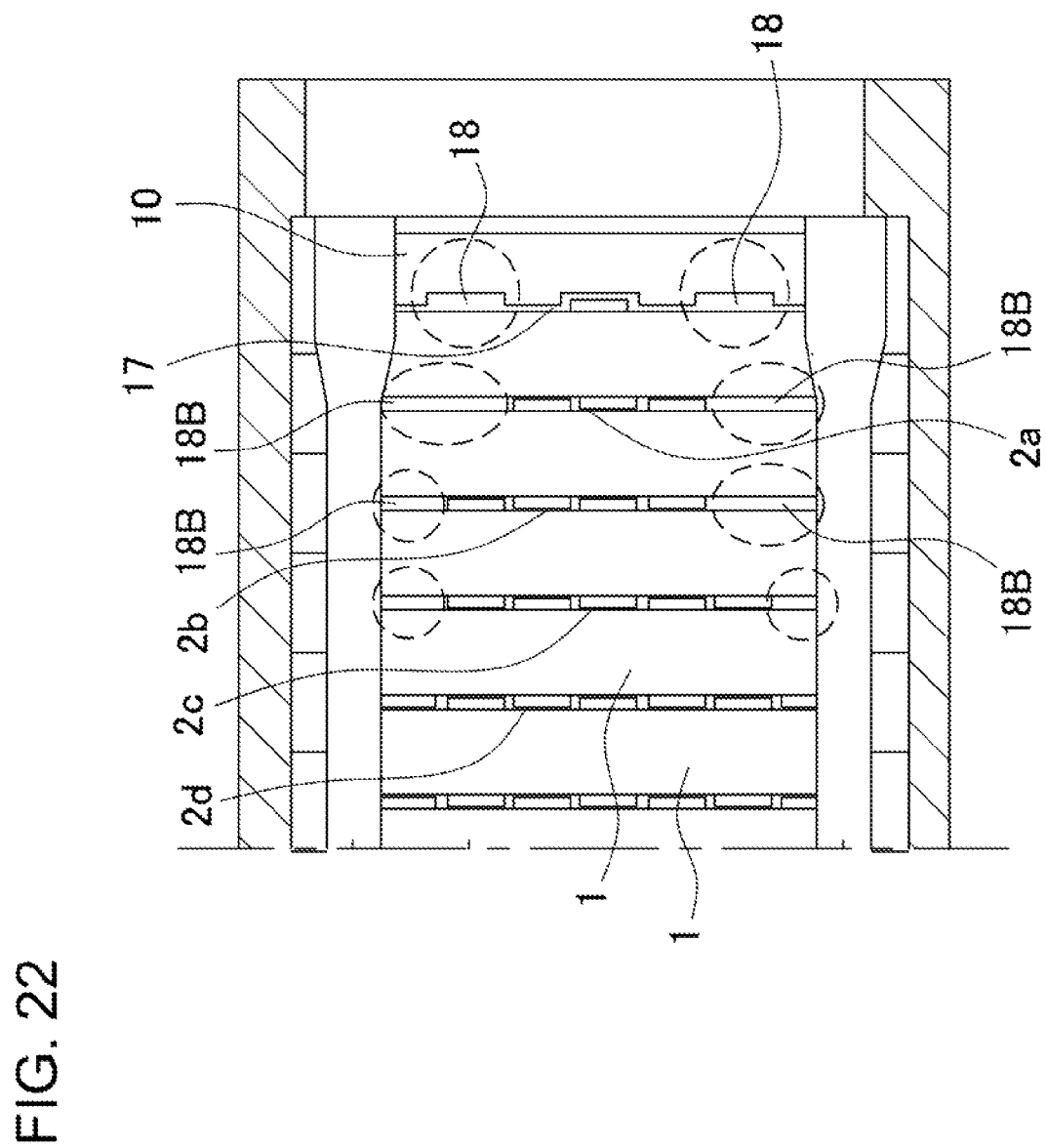
FIG. 22 is a cross-sectional view showing the battery block.

The following description will describe power supply devices according to embodiments of the present invention with reference to FIGS. 1 to 17. In the embodiments, the present invention is applied to a vehicle power supply device. FIGS. 1 to 9 show a power supply device 100 according to a first embodiment of the present invention. FIGS. 10 to 13 show a power supply device 200 according to a second embodiment of the present invention. FIGS. 14 to 17 show a power supply device 300 according to a third embodiment of the present invention. FIG. 18 is a perspective view showing bind bars according to a modified embodiment of the present invention. FIG. 19 is a perspective view showing an end spacer. FIG. 20 is a perspective view showing the end spacer shown in FIG. 19 as viewed from the back side. FIG. 21 is a perspective view showing the end spacer and an end plate to be engaged with the end spacer. FIG. 22 is a cross-sectional view showing the battery block. The power supply devices according to these embodiments are suitable mainly for power supplies of electric vehicles such as hybrid cars that are driven by both an engine and a motor, and electric vehicles that are driven only by a motor. However, the power supply devices can be used for vehicles other than hybrid cars or electric vehicles, and can be also used for applications other than electric vehicle that require high power.

Figure 9:
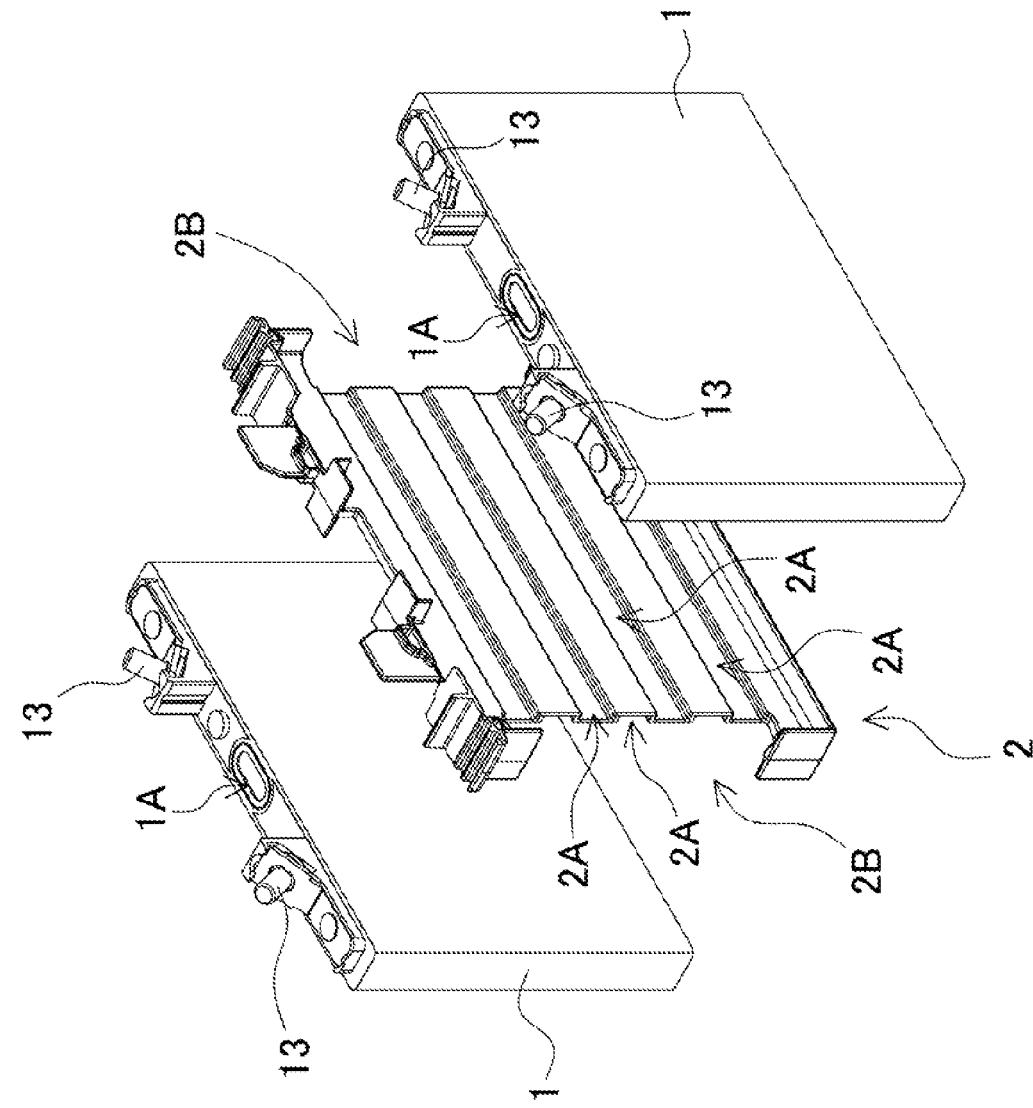
FIG. 9 is an exploded perspective view showing the side-by-side arrangement of battery cells and a separator.
Figure 10:
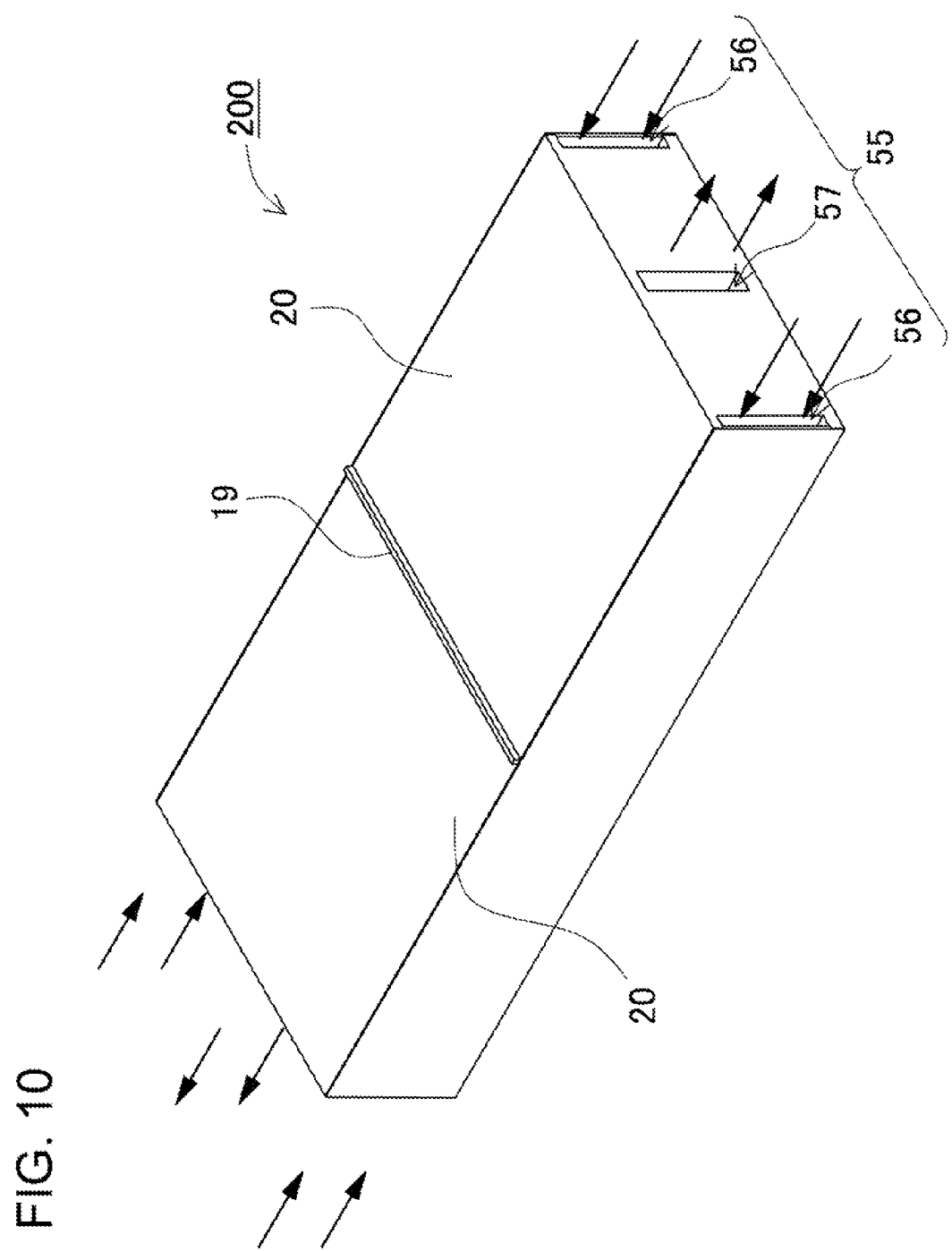
FIG. 10 is a perspective view schematically showing a battery system according to another embodiment of the present invention.

These illustrated power supply devices include battery blocks 3, and a blower mechanism(s) 9. Each of the battery blocks 3 is composed of a plurality of battery cells 1 of rectangular batteries. The battery cells 1 are arranged side by side to form cooling gaps 4 between the battery cells 1. The blower mechanism 9 forcedly blows cooling gas to cool the battery cells 1 of this battery block 3. In the battery block 3, separators 2 are interposed between the battery cells 1, which are arranged side by side. The separator 2 has a shape that can define the cooling gaps 4 between the battery cells 1 as shown in FIG. 9. The illustrated separator 2 holds the battery cells 1 by a fit-in structure. Specifically, the battery cells 1 are fitted in the separator 2 on the both surfaces of the separator 2. Thus, adjacent battery cells 1 are arranged side by side without positional deviation by the separator 2 that holds the battery cells 1 by using the fit-in structure.

The battery cells 1 of rectangular batteries 1 are lithium-ion rechargeable batteries. However, the battery cells may be nickel-hydrogen batteries or nickel-cadmium batteries. The illustrated battery cell 1 has a rectangular shape with a predetermined thickness, includes positive/negative electrode terminals 13 and an opening 1A for a safety valve. The positive/negative electrode terminals 13 protrude from the ends of the upper surface of the battery cell 1. The opening 1A is located in the middle of the upper surface of the battery cell 1. The adjacent electrode terminals 13 of the side-by-side arranged battery cells 1 are serially connected to each other by connectors (not shown). In the power supply device, one of the positive and negative electrode terminals 13 is laid on and thus coupled to the other of the positive and negative electrode terminals 13 so that adjacent battery cells 1 are serially connected to each other. The positive and negative electrode terminals 13 can be serially connected to each other by busbars (not shown). In the case of the power supply device in that adjacent battery cells 1 are serially connected to each other, the output voltage of the power supply device can be high, and as a result the power supply device can provide high power. However, in the power supply device according to the present invention, adjacent battery cells may be connected in parallel to each other. The battery cell 1 includes a metal exterior container. The separator 2 is made of an electrically-insulating material, and interposed between the battery cells 1. Accordingly, it is possible to prevent that a short circuit occurs between the exterior containers of the adjacent battery cells 1. The exterior container of the battery cell may be formed of an electrically-insulating material such as plastic. In this case, since the electrically-insulating exterior containers of the battery cells are not necessarily arranged side by side, the separator may be formed of metal.

Figure 6:
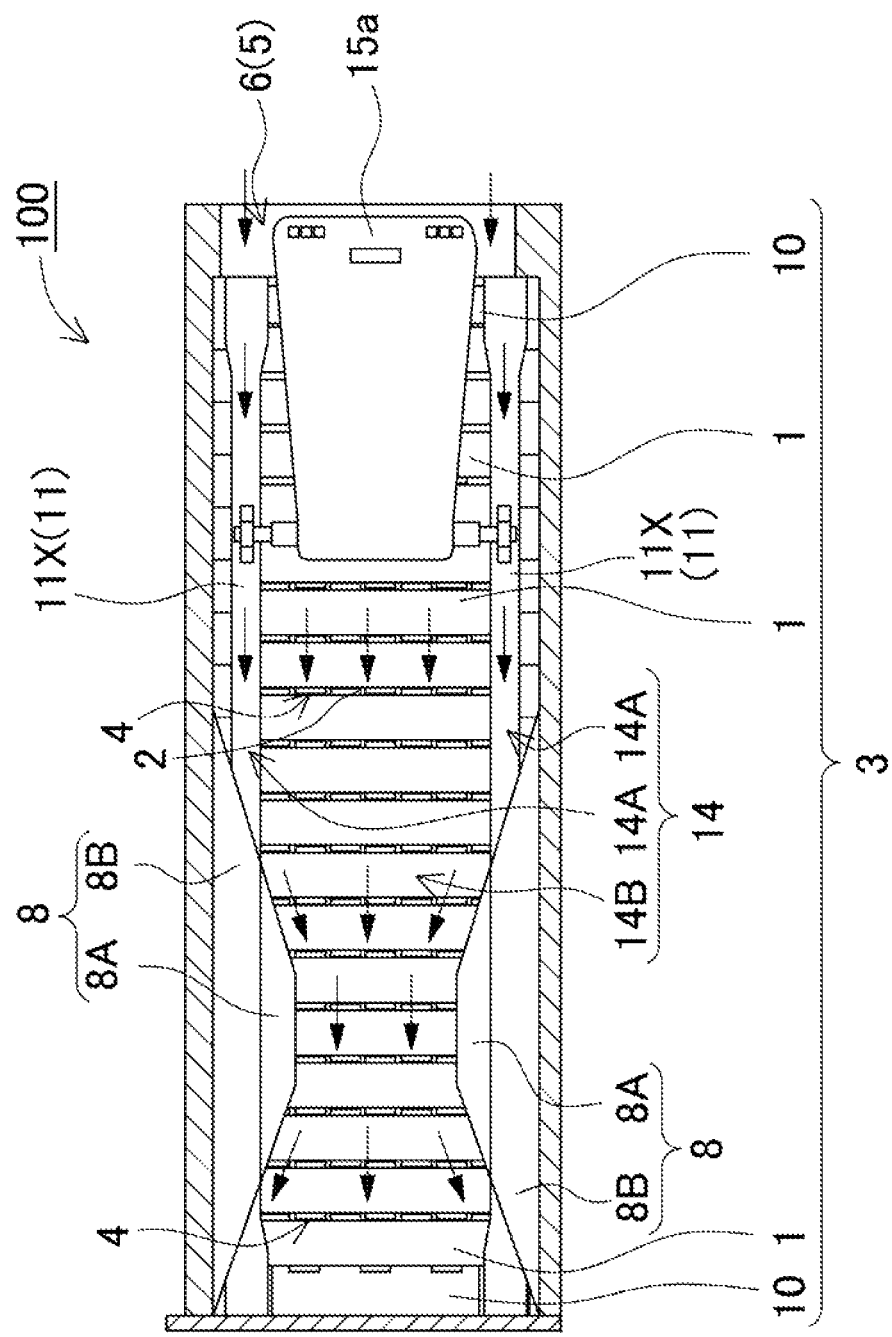
FIG. 6 is a cross-sectional view showing the battery system shown in FIG. 4 taken along a line VI-VI.

The separator 2 is formed of an electrically-insulating material such as plastic, and electrically insulates the adjacent battery cells 1 from each other. As shown in FIG. 6, the separator 2 can have the cooling gaps 4, which are formed between the battery cells 1. Cooling gas such as air can pass the cooling gaps 4 to cool the battery cells 1. The separator 2 shown in FIG. 9 has a plurality of grooves 2A on the sides that face the battery cells 1. The grooves 2A extend to the both edges of the separator 2. The cooling gaps 4 are thus formed between the battery cells 1. In the illustrated separator 2, the grooves 2A are arranged in parallel to each other at a predetermined interval. The grooves 2A are formed on the both sides of the separator 2 shown in FIG. 9. Thus, the cooling gaps 4 are formed between each of adjacent battery cells 1 and the separator 2. The thus-configured power supply device has a feature in that the battery cells 1 on the both sides of the separator can be effectively cooled by the cooling gaps 4, which are formed on the both sides of the separator 2. However, the grooves may be formed only on one side of the separator. In this case, the cooling gaps are formed between the battery cell and the separator. The illustrated cooling gap 4 extends in the horizontal direction, and opens toward the left and right edges of the battery block 3. Also, the separator 2 shown in FIG. 9 has cut-out portions 2B on both edge parts. The width between surfaces of adjacent battery cells 1 opposed to each other can be wide in the cut-out portion 2B on both edge parts of the separator 2 so that cooling gas flow resistance can be small. For this reason, cooling gas can smoothly pass from the cut-out portion 2B through the cooling gaps 4 between the separator 2 and the battery cells 1. Therefore, the battery cells 1 can be effectively cooled. As discussed above, air is forcedly blown through the cooling gaps 4, and efficiently and directly cools the exterior containers of the battery cells 1. The thus-configured power supply device has a feature in that thermal runaway of the battery cell 1 can be effectively prevented and the battery cells 1 can be efficiently cooled.

(End Plate 10)

Figure 8:
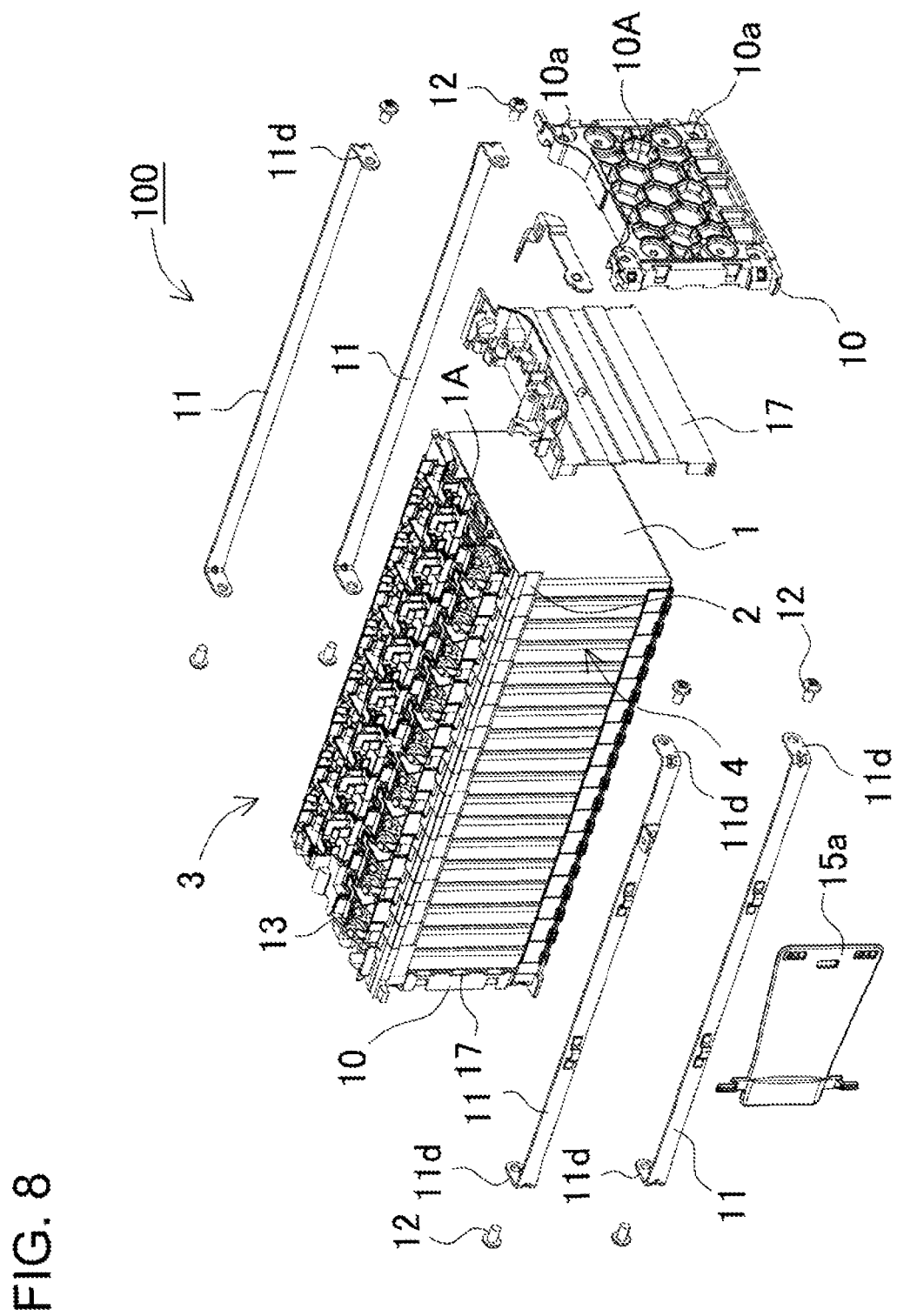
FIG. 8 is an exploded perspective view showing a battery block of the battery system shown in FIG. 2.

A pair of end plates 10 is arranged on the both ends of the battery block 3. The pair of end plates 10 is coupled by coupling members 11 so that the side-by-side arranged battery cells 1 and the separators 2 are secured between the end plates 10. The end plates 10 have a rectangular shape corresponding to the external shape of the battery cell 1. The both ends of the coupling member 11 are bent inward as shown in FIG. 8. These bent portions 11d are secured to the end plates 10 by fastening screws 12. Although not illustrated, the bent portions of the coupling members may extend and surround the end plates, and may be secured to the end plates by the fastening screws. Alternatively, threaded holes may be formed on the side surface of the end plate. In this case, the coupling members are secured to the end plates by fastening screws that penetrate the coupling members. These coupling members to be secured to the outer side surfaces of the end plates do not have the bent portions, but are formed in a straight shape and secured to the end plates.

The end plate 10 shown in FIG. 8 is formed of metal. The end plate 10 includes reinforcing ribs 10A that are integrally formed with the outside of the end plate 10 whereby reinforcing the end plate 10. The metal end plate 10 has sufficient strength, and can bear fastening torque of the fastening screws 12. The coupling holes 10a are formed on the outside surface of the end plate 10, and receive the bent portions 11d of the coupling members 11. The end plate 10 has four coupling holes 10a on the outside surface at the four-corner parts. The coupling holes 10a are threaded holes. The fastening screws 12 pass through the coupling members 11, and are screwed into the threaded holes. Thus, the coupling members 11 can be secured to the end plates 10.

(Coupling Member 11)

Bind bars 11X corresponds to the coupling members 11. The bind bar 11X has a predetermined vertical width. The bind bar 11X as the coupling member 11 is a metal plate with a predetermined vertical width. The both ends of the bind bars 11X as the coupling members 11 are secured to the four corner parts of the end plates 10. The bind bars 11X are arranged in parallel to each other on the upper and lower parts of the both side edges of the battery cells 1. In the battery block 3 with the bind bars 11X being secured to the upper and lower part of both sides, some of the cooling gaps 4 arranged between the battery cells 1 in the upper and lower parts of will be closed by the bind bars 11X. That is, if a cooling gap 4 is closed by the bind bar 11X, cooling gas does not flow into the closed cooling gap 4 though an opening 14 of the closed cooling gap 4. The cooling gaps 4 have openings 14 that open on the both side edges of the battery cells 1. Openings 14 can be classified into closed portions 14A and an exposed portion 14B. The closed portions 14A are located on the upper and lower parts of the battery cells 1, and are closed by the bind bars 11X. The openings 14 in the exposed portion 14B are not closed by the bind bars 11X. The exposed portion 14B is formed between the closed portions 14A on the upper and lower parts, and is connected to fan ducts 5. The exposed portion 14B is connected to an inlet duct 6. The cooling gas is forcedly blown into the exposed portion 14B through the inlet duct 6. The bind bars 11X as the coupling members 11 are arranged on the upper and lower parts of the both sides of the battery block 3. As a result, the cooling gaps 4 can be classified into the upper and lower closed portions 14A, and the exposed portion 146. An exposed portion 14B on one side is connected to the inlet duct 6, while an exposed portion 14B on the other side is connected to the outlet duct 7. Thus, the battery cells 1 are cooled by the cooling gas.

The thus-configured battery blocks 3 are arranged in two rows as shown in FIGS. 2, 4, 5 and 7. The fan ducts 5 are arranged in a part between the two rows of battery blocks 3, and parts outside the two rows of battery blocks 3. In the illustrated power supply device, the inlet duct 6 is arranged in the part between the two rows of battery blocks 3, and communicates with cooling gaps 4. The outlet ducts 7 are arranged in parts outside the two rows of battery blocks 3 so that the cooling gaps 4 are connected in parallel to each other between each of the outlet ducts 7 and the inlet duct 6. In this power supply device, as shown by arrows in FIGS. 1 and 4, cooling gas is forcedly blown from the inlet duct 6 toward the outlet ducts 7 by the blower mechanisms 9 to cool the battery cells 1. The cooling gas is forcedly blown from the inlet duct 6 toward the outlet ducts 7, and is then branched from the inlet duct 6. Thus, the cooling gas flows in the cooling gaps 4 to cool the battery cells 1. After cooling the battery cells 1, the branched cooling gas flows merge into the outlet duct 7. After that, the merging cooling gas is discharged.

Although the inlet duct 6 is arranged in the part between the two rows of battery blocks 3, and communicates with cooling gaps 4, and the outlet ducts 7 are arranged in parts outside the two rows of battery blocks 3 in the illustrated power supply device according to this embodiment, the power supply device according to the present invention may have inlet and outlet ducts that change places. In the power supply device 200 according to the second embodiment shown in FIGS. 10 to 13, inlet ducts 56 are arranged in parts outside the two rows of battery blocks 3, and an outlet duct 57 is arranged in the part between the two rows of battery blocks 3 and communicates with cooling gaps 4. In this power supply device, as shown by arrows in FIGS. 10 and 11, cooling gas is forcedly blown from the inlet ducts 56 arranged outside toward the outlet duct 57 arranged inside by the blower mechanisms 9 to cool the battery cells 1. The cooling gas is forcedly blown from the inlet ducts 56 arranged outside, and then cooling gas flows pass through the cooling gaps 4 to cool the battery cells 1. After cooling the battery cells 1, cooling gas flows merge into the outlet duct 57. After that, the merging cooling gas is discharged. The cooling gas can be outside air, air heat-exchanged with coolant, coolant or the like.

Figure 3:
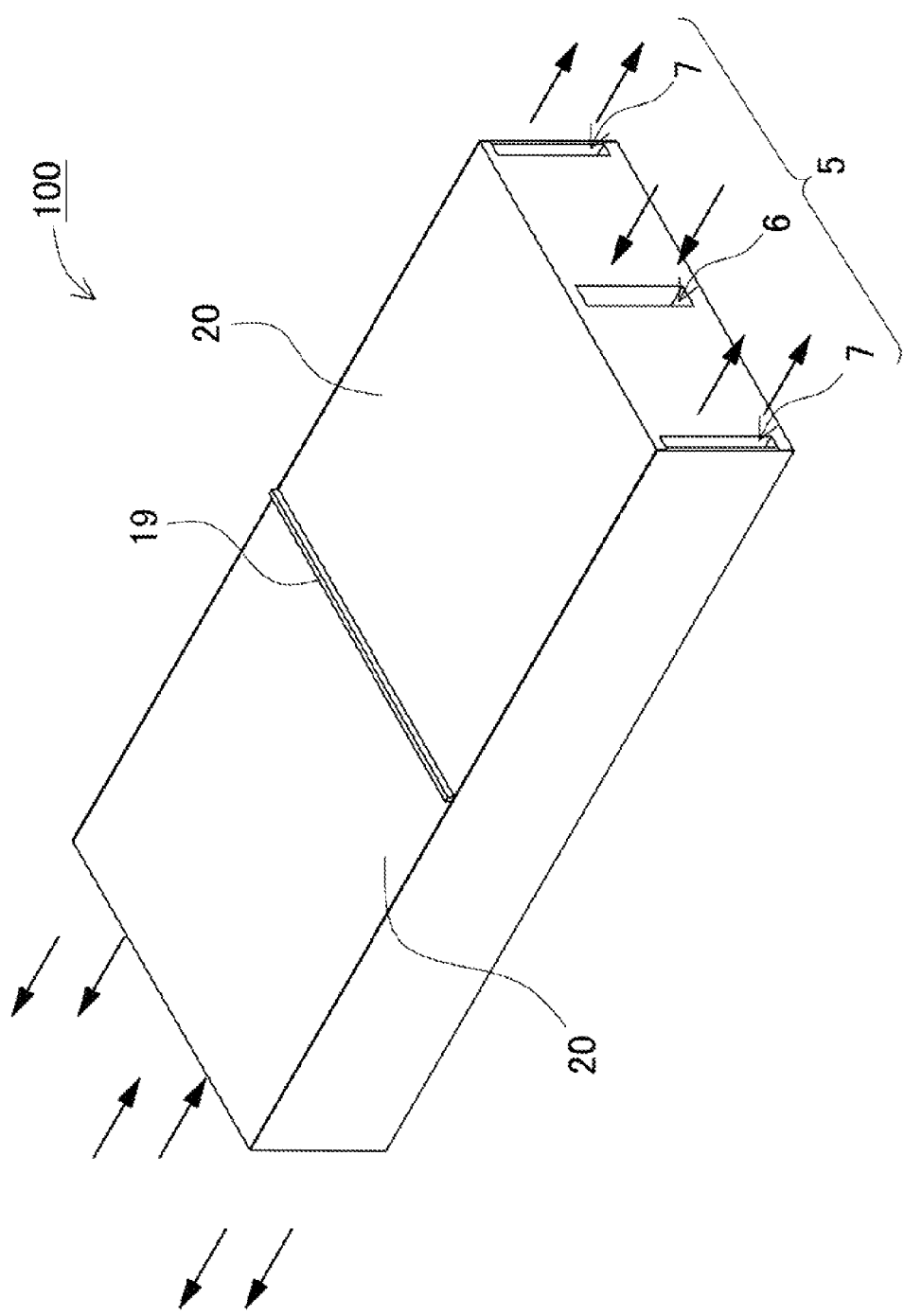
FIG. 3 is a perspective view schematically showing a battery system according to the embodiment of the present invention.
Figure 4:
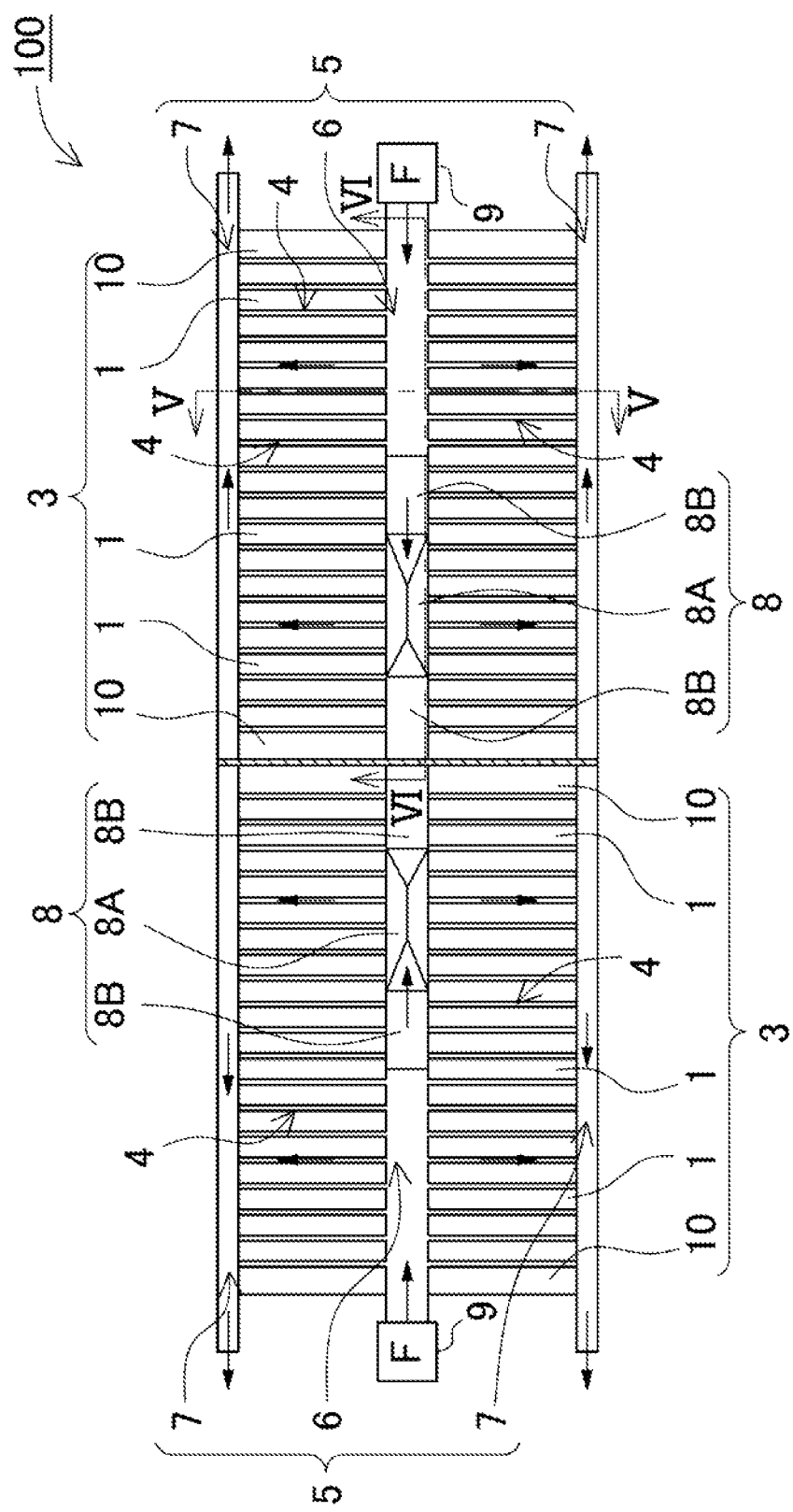
FIG. 4 is a horizontal cross-sectional view schematically showing the battery system shown in FIG. 3.
Figure 7:
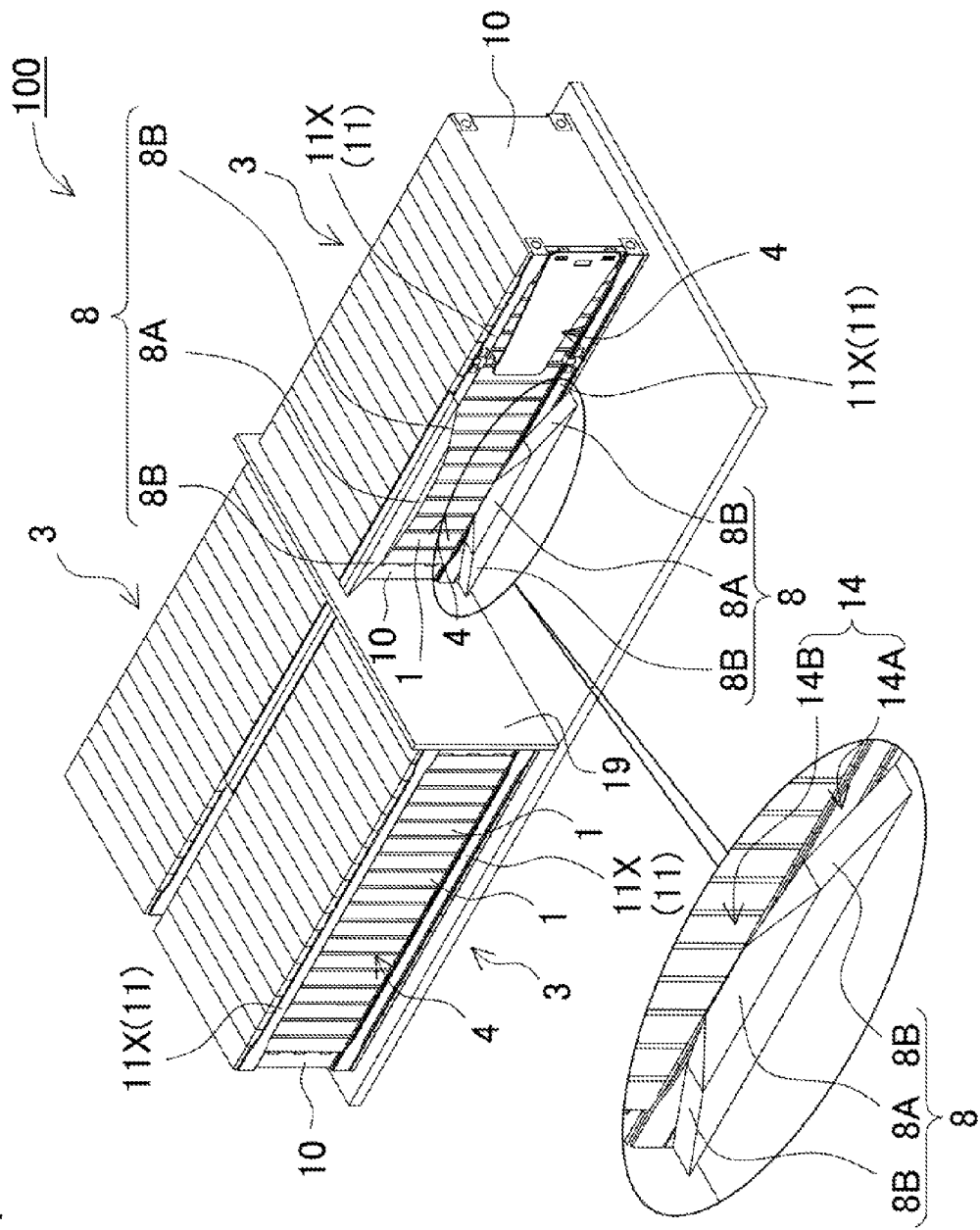
FIG. 7 is a perspective view schematically showing the internal structure of the battery system shown in FIG. 3 with a part of the battery system being enlarged.
Figure 11:
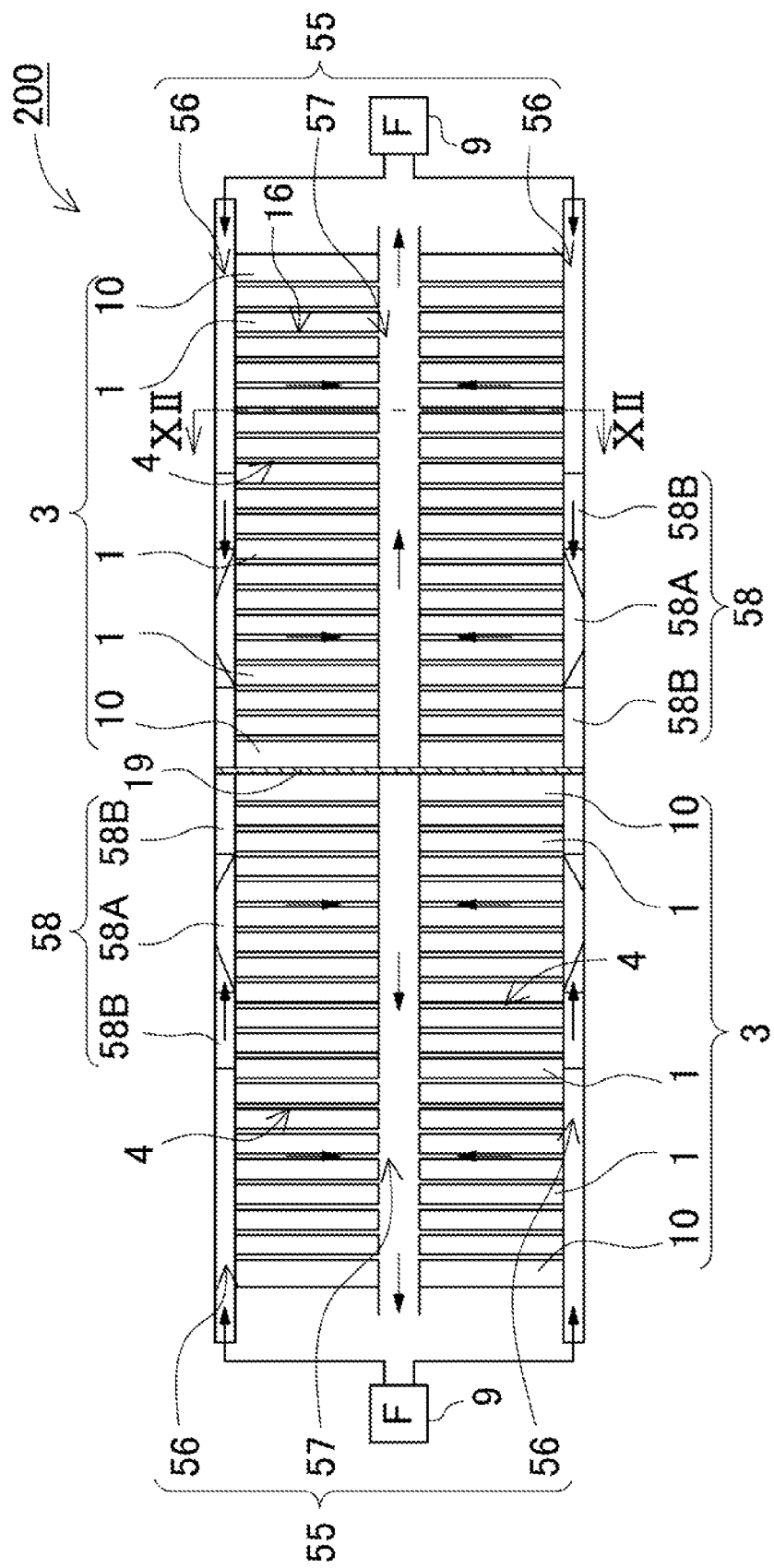
FIG. 11 is a horizontal cross-sectional view schematically showing the battery system shown in FIG. 10.

Each of the power supply devices shown FIGS. 1 to 5 and FIGS. 10 to 13 includes four battery blocks 3. The four battery blocks 3 are arranged in two columns and two rows. Two battery blocks 3 that compose each column are arranged in parallel to each other in two rows so that the fan ducts 5 or 55 are arranged inside and outside. In addition, in the illustrated power supply device, two sets of the thus-arranged parallel two battery blocks 3 are arranged in two columns. That is, as shown in FIGS. 3 and 7, a center barrier wall 19 is arranged between the two sets of battery blocks 3 that compose adjacent columns so that two sets of fan ducts 5 or 55 arranged inside and outside in two columns of battery blocks 3 are cut off from each other. Accordingly, in the power supply devices, cooling gas is provided to the battery blocks 3 in each column through the separated inlet ducts 6 or 56, as shown in FIG. 4 and FIG. 11, and the cooling gas is forcedly blown into the cooling gaps 4 and is then discharged through the separate outlet ducts 7 or 57. In the illustrated power supply devices, cooling gas is forcedly blown from the inlet ducts 6 and 56 to the outlet ducts 7 and 57 in opposite directions, and cools the battery cells 1.

The aforementioned power supply devices include four battery blocks 3, which are arranged in two columns and two rows. Two battery blocks 3 are arranged in parallel to each other in each of two rows. However, the power supply device can include only two battery blocks 1 that are arranged in parallel to each other in two rows. That is, battery blocks 1 can be arranged in one column and two rows. In this illustrated power supply device, cooling gas can be forcedly blown between the inlet and outlet ducts in either direction, and can cool the battery cells 1. In the case where four battery blocks arranged in two columns and two rows, the center barrier wall may not be provided between the battery blocks in two columns and the between fan ducts in two columns but a set of two battery blocks adjacent to each other in the row direction may be aligned in straight. In this case, two sets of the thus-aligned battery blocks may be arranged in parallel to each other in two rows so that the fan ducts are arranged inside and outside. In this power supply device, the inlet duct(s) can be one of the fun duct arranged inside and a pair of the fun ducts arranged outside in the battery blocks, which are arranged in two columns and two rows, while the outlet duct(s) can be the other so that cooling gas forcedly blown from the inlet duct(s) is led to the cooling gaps and is discharged through the outlet duct(s). Also, in this power supply devices, cooling gas can be forcedly blown between the inlet and outlet ducts in either direction, and can cool the battery cells 1.

The area of the fan duct 5 arranged between battery blocks 3 arranged in parallel to each other in two rows is twice the area of the fan ducts 5 arranged outside the battery blocks 3 in two rows. The reason is that cooling gas forcedly blown through the inlet duct 6 arranged between two battery blocks 3 is branched into two flows, and the branched cooling gas flows are discharged through the outlet ducts 7 arranged on the both sides in the power supply device shown in FIGS. 1 to 5. Also, cooling gas forcedly blown through the inlet ducts 56 arranged on the both sides is discharged through the outlet ducts 57 arranged between two battery blocks 3 in the power supply device shown in FIGS. 10 to 13. That is, in the power supply device shown in FIGS. 1 to 5, since the inlet duct 6 passes cooling gas twice as much as the outlet ducts 7 on the both sides, the inlet duct 6 is required to have a cross-sectional area twice as large as the outlet ducts 7 in order to reduce pressure loss. In the power supply device shown in FIG. 5, in order that the inlet duct 6 as the fan duct 5 arranged inside can have a larger cross-sectional area, the width of the inlet duct 6 is designed twice as large as the width of the outlet duct 7. Also, in the power supply device shown in FIGS. 10 to 13, since the outlet duct 57 arranged inside passes cooling gas twice as much as the inlet ducts 56 on the both sides, the outlet duct 57 is required to have a cross-sectional area twice as large as the inlet ducts 57 in order to reduce pressure loss. In the power supply device shown in FIG. 12, in order that the outlet duct 57 as the fan duct 55 arranged inside can have a larger cross-sectional area, the width of the outlet duct 57 is designed twice as large as the width of the inlet duct 56.

In the aforementioned power supply device, the battery blocks 3 are arranged in parallel to each other in two rows, the fan ducts 5 and 55 are arranged in a part between the two rows of battery blocks 3, and in parts outside the two rows of battery blocks 3. However, the power supply device can be composed of one row of battery blocks. In the power supply device 300 according to the third embodiment shown in FIGS. 14 to 17, two fan ducts 75 are on the both sides of the one row of battery blocks 3. One of the two fan ducts 75 serves as an inlet duct 76, while the other of the two fan ducts 75 serves as an outlet duct 77. In this power supply device 300, as shown by arrows in FIGS. 14 and 15, cooling gas is forcedly blown from the inlet duct 76 toward the outlet ducts 77 by the blower mechanism 9 to cool the battery cells 1. The cooling gas is forcedly blown from the inlet ducts 76, and then cooling gas flows pass through the cooling gaps 4 to cool the battery cells 1. After cooling the battery cells 1, the cooling gas flows merge into the outlet duct 77. After that, the merging cooling gas is discharged. Since the cooling gas flow rates in the inlet and outlet ducts 76 and 77 are equal to each other in this power supply device 300, the inlet and outlet ducts 76 and 77 arranged on the both sides are designed to have the same cross-sectional area, that is, the widths of the inlet and outlet ducts 76 and 77 are dimensioned equal to each other.

(Temperature Equalizing Plate 15)

In the power supply device, a temperature equalizing plate can be attached onto a part of a side of the battery block. The temperature equalizing plate restricts cooling performance on battery cells. The restriction amount gets larger as closer to a battery cell on the upstream side of cooling gas. The restriction is achieved by closing cooling gaps 4 with the temperature equalizing plate. The closing amount gets smaller along the flowing direction of cooling gas. Thus, it is possible to reduce the temperature difference among battery cells. The battery blocks shown in FIGS. 6 and 8 are provided with the temperature equalizing plate 15a the vertical width of which gets larger as closer to a battery block on the edge. In a power supply device according to a modified embodiment, as shown in FIG. 18(a), the temperature equalizing plate 15 is attached onto a part of the side of the battery block 3 on the inlet duct 6 side so that the temperature difference among battery cells 1 can be reduced. The temperature equalizing plate 15 is a metal plate or a heat resistant plastic plate with a flowing amount adjusting opening 16 that penetrates the plate. In an exemplary bind bar 11B shown in FIG. 18(a), the temperature equalizing plate 15 is attached to the outside of the battery block 3. The temperature equalizing plate 15 is secured onto the surface of the bind bar 11D by an adhesive. However, although not illustrated, the temperature equalizing plate can be attached onto the surface of the bind bar by a fit-in structure or screws. Also, in the power supply device, the temperature equalizing plate can be attached to the battery block by sandwiching the temperature equalizing plate between the bind bar and the battery block.

The temperature equalizing plate 15 shown in FIG. 18(a) has the flowing amount adjusting opening 16, which extends in the side-by-side arrangement direction of the battery cells 1 along the vertical center line of the temperature equalizing plate 15. The temperature equalizing plate 15 includes upper and lower closing bars 15A, and coupling bars 15B. The flowing amount adjusting opening 16 is formed between the upper and lower closing bars 15A. The both ends of the upper and lower closing bars 15A are coupled by the coupling bars 15B. The illustrated temperature equalizing plate 15 has an external shape that can be attached to the bind bar 11. The bind bar 11 includes upper and lower bars 11e and 11f. More specifically, the temperature equalizing plate 15 has a vertical width that allows the temperature equalizing plate 15 to be secured between a horizontal rib 11b of the upper bar 11e and a horizontal rib 11b of the lower bar 11f of the bind bar 11B, and a length that allows the temperature equalizing plate 15 to be secured onto the outside surfaces of coupling portions 11g. The coupling portions 11g couple the ends of the upper bar 11e to the ends of the lower bars 11f in the bind bar 11. In this temperature equalizing plate 15, the upper and lower closing bars 15A are arranged on the surfaces of in the upper bar 11e and lower bar 11f of the bind bar 11B so that the closing bars 15A can be arranged in the closed portion 14A of the bind bar 11B. According to the thus-configured temperature equalizing plate 15, the closing bars 15A are arranged in the upper and lower parts of the temperature equalizing plate 15, but the closing bars 15A do not interfere with cooling gas flowing into in the cooling gaps 4 among cooling gaps 4 that are arranged adjacent to a battery cell 1 the temperature of which is likely to rise higher. In addition, in the case where the periphery of the temperature equalizing plate 15 is attached to the bind bar 11B by an adhesive, fastening screws or a fit-in structure, the temperature equalizing plate 15 can be firmly secured. In addition, in the case where the temperature equalizing plate 15 has a rectangular peripheral shape with the flowing amount adjusting opening 16 formed inside the rectangular peripheral shape, the temperature equalizing plate 15 can be easily manufactured by cutting out a metal or plastic plate.

The bind bar 11B shown in FIG. 18(a) is attached onto each of the both sides of the battery block 3. The both ends of the bind bar 11B are secured on the end plates 10. In the bind bar 11B shown in FIG. 18(a), the coupling portions 11g couple the ends of the upper bar 11e arranged along the upper edge of the battery block 3 to the ends of the lower bar 11f arranged along the lower edge of the battery block 3. The coupling portions 11g are secured to the end plates 10. The coupling portions 11g of the bind bar 11B are bent inward so as to fit the shape of a part from the peripheral surface to the main surface of the end plate 10. Thus-formed bent portions 11h are secured onto the end plates 10. The bind bar 11B is manufactured by cutting and then stamping a metal plate of iron or iron alloy. The upper bar 11e and the lower bar 11f of the illustrated bind bar 11B have an L shape in traverse section so that the horizontal rib 11b is coupled to a vertical rib 11a. In this bind bar 11B, the vertical rib 11a extends in parallel to the side of the battery block 3. The vertical rib 11a can be reinforced by the horizontal rib 11b. In the bind bar 11B shown in FIG. 18(a), connection holes 11c are formed on the horizontal rib 11b arranged on the upper edge of the upper bar 11e. The bind bar 11B can be secured to a flange portion of an exterior case through the connection holes 11c.

The temperature equalizing plate 35 can be integrally formed with a bind bar 11C of metal plate as shown in FIG. 18(b). Also, in the bind bar 11C, a coupling portions 31C couple the ends of an upper bar 31A arranged along the upper edge of the battery block 3 to the ends of a lower bar 31B arranged along the lower edge of the battery block 3. Bent portions 31D are coupled to the coupling portions 31A, and are secured to the end plates 10. In the temperature equalizing plate 35, a flowing amount adjusting opening 36 is formed between the upper bar 31A and the lower bar 31B. The opening width of flowing amount adjusting opening 36 varies in the side-by-side arrangement direction of the battery cells 1. The flowing amount adjusting opening 36 of the temperature equalizing plate 35 is formed in a process in that the bind bar 11C is machined. In this battery block 3, since the temperature equalizing plate 35 is formed integrally with the bind bar 11C that can be firmly secured to the battery block 3, it is possible to reliably prevent positional deviation of the temperature equalizing plate 35. As a result, it is possible to reduce the temperature difference among the battery cells 1 for long time.

Cooling gas in the inlet duct 6 passes through the flowing amount adjusting openings 16 and 36 of the temperature equalizing plates 15 and 35, and flows into cooling gaps 4. The reason is that the openings 14 of the cooling gaps 4 open toward the inlet duct 6 through the flowing amount adjusting opening 16 or 36. The flowing amount adjusting openings 16 and 36 have a shape that extends in the side-by-side arrangement direction of the battery cells 1 so that cooling gas can flow into the cooling gaps 4. The flowing amount adjusting opening 16 or 36 of the temperature equalizing plate 15 or 35 shown in FIG. 18(a) or (b) opens so as to allow cooling gas to flow into all of the cooling gaps 4. However, this structure is just an example. If a battery cell exists that has a relatively low cell temperature and is not required to be cooled by cooling gas, cooling gaps adjacent to the battery cell that is not required to be cooled are not necessarily open through the flowing amount adjusting opening. The flowing amount adjusting opening does not necessarily allow all of the cooling gaps to open toward the inlet duct. The opening area of the flowing amount adjusting opening 16 or 36 in the temperature equalizing plate 15 or 35 can adjust the opening areas of the openings 14 of the cooling gaps 4 that open toward the inlet duct 6 so that the flowing amounts of cooling gas flows can be controlled that flow into cooling gaps 4.

In the battery block 3 that has a number of battery cells 1 arranged side by side, if the opening areas of all the cooling gaps 4 are the same, the temperature of a battery cell 1 arranged on upstream side of the inlet duct 6 will become lower than a battery cell 1 on the downstream side. The reason is that cooling gas forcedly passed through the inlet duct 6 flows into cooling gaps 4 on the upstream side at a larger flowing rate, and flows into cooling gaps 4 on the downstream side at a lower flowing rate. In the temperature equalizing plate 15 shown in FIG. 18(a), the opening area of the flowing amount adjusting opening 16 increases toward the downstream side so that the battery cell 1 on the upstream side is restrictedly cooled while the battery cell 1 on the downstream side is efficiently cooled.

In the temperature equalizing plate 15 shown in FIG. 18(a) or (b), since the opening area of the flowing amount adjusting opening 16 on the upstream side is smaller than the downstream side, the battery cell 1 on the upstream side can be restrictedly cooled so that the temperature difference among the battery cells 1 is reduced. Since the flowing amount adjusting opening 16 serves to adjust the opening areas of the cooling gaps 4 that open toward the inlet duct 6 so that the flowing amounts of cooling gas flows can be controlled that flow into cooling gaps 4, the flowing amount adjusting opening does not necessarily has the illustrated shape. For example, a number of through holes may be formed in the temperature equalizing plate at an adjusted density or size. Alternatively, the temperature equalizing plate may be provided with a number of slits with different opening areas that vary in the side-by-side arrangement direction of the battery cells.

(Temperature Equalizing Walls 8, 58, 78)

Temperature equalizing walls 8, 58, and 78 are arranged in the inlet ducts 6, 56 and 76 to reduce the temperature difference among the battery cells 1. The temperature equalizing walls 8, 58 and 78 have an elongated shape. Their entire length in the cooling gas flowing direction is longer than their width. In the temperature equalizing walls 8, 58 and 78, one end part on the upstream side is tapered to get thinner toward the tip end. In the temperature equalizing walls 8, 58 and 78 shown in FIGS. 5 to 7, 12, 13, 15 and 17, the other end part on the downstream side is also getting thinner toward the tip end. Accordingly, it is possible to suppress that the cooling gas flow become turbulent. As a result, cooling gas can smoothly flow. A turbulent flow in the inlet ducts 6 and 56 and 76 may increase pressure loss. For this reason, in the case where the both end parts of the temperature equalizing walls 8, 58 and 78 on the upstream and downstream sides get thinner toward the tip ends, it is possible to reduce pressure loss caused by turbulent flow.

In the illustrated temperature equalizing walls 8, 58 and 78, the end parts on the upstream and the downstream sides are inclined so that the vertical width of the end parts gets smaller toward the tip ends. Thus, the entire shape of the temperature equalizing walls 8, 58 and 78 is a trapezoid the center part of which is high. In the power supply devices shown in FIGS. 7, 13 and 17, the temperature equalizing walls 8, 58, and 78 are arranged at opposed upper and lower positions in the inlet ducts 6, 56 and 76. In the temperature equalizing walls 8, 58, and 78 arranged at the lower position in the inlet duct 6, 56 and 76, the end parts are inclined downward toward the tip ends. In the temperature equalizing walls 8, 58, and 78 arranged at the upper position in the inlet duct 6, 56 and 76, the end parts are inclined upward toward the tip ends. The temperature equalizing walls 8, 58 and 78 have a trapezoidal shape as a whole. In the case where the temperature equalizing walls 8, 58 and 78 are arranged at the upper and lower positions in the inlet ducts 6, 56 and 76, the temperature difference among the battery cells can be reduced by the temperature equalizing walls 8, 58, and 78 with low height, i.e., small vertical width. As a result, it is possible to further reduce pressure loss, and additionally to reduce the temperature difference among the battery cells. However, in the power supply device according to the present invention, the temperature equalizing walls are not necessarily arranged at the upper and lower positions in the inlet duct. For example, although not illustrated, the temperature equalizing wall may be arranged only at the upper position or at the lower position in the inlet duct.

Figure 5:
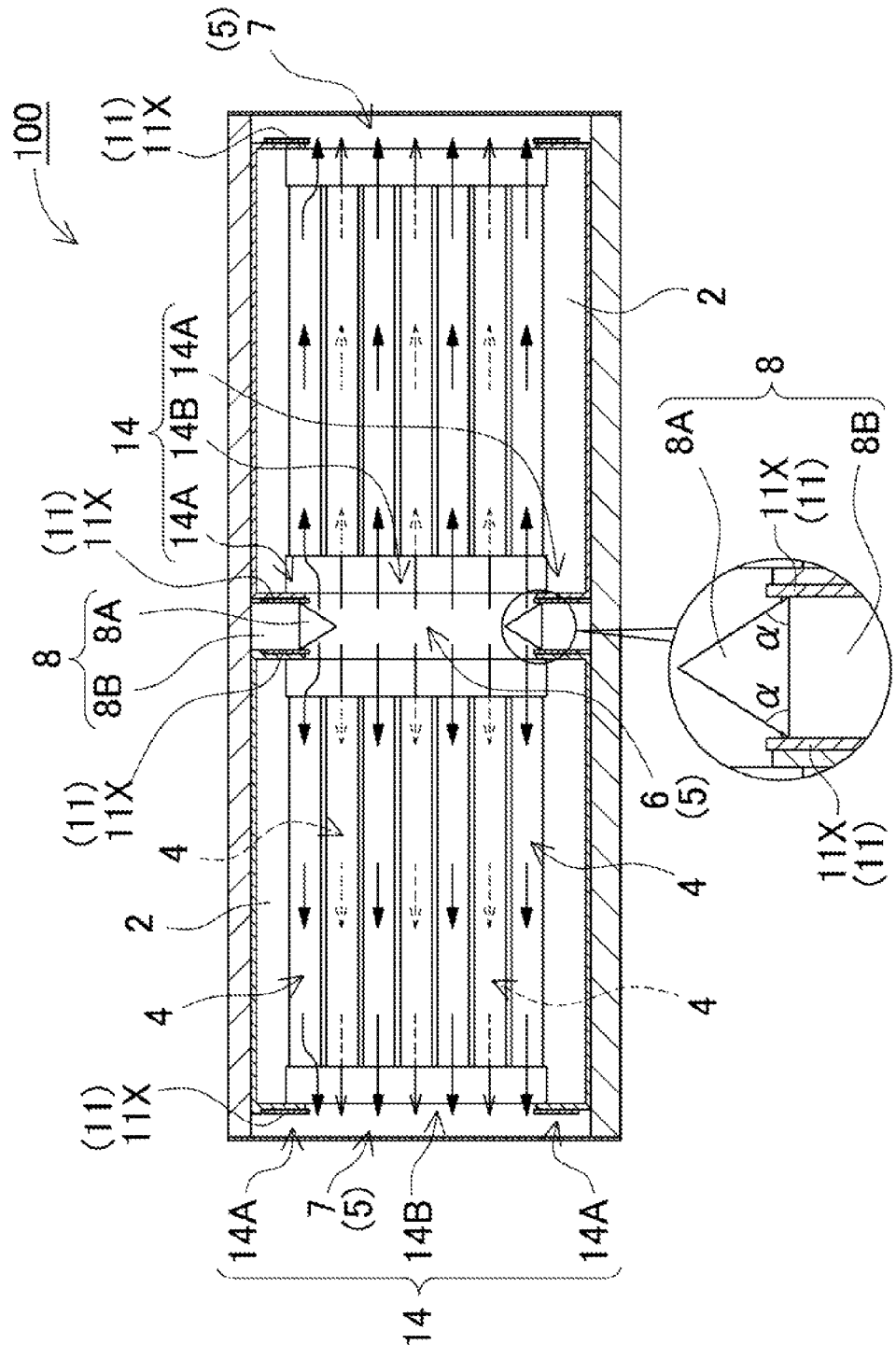
FIG. 5 is a cross-sectional view of the battery system shown in FIG. 4 taken along a line V-V with a part of the battery system being enlarged.
Figure 12:
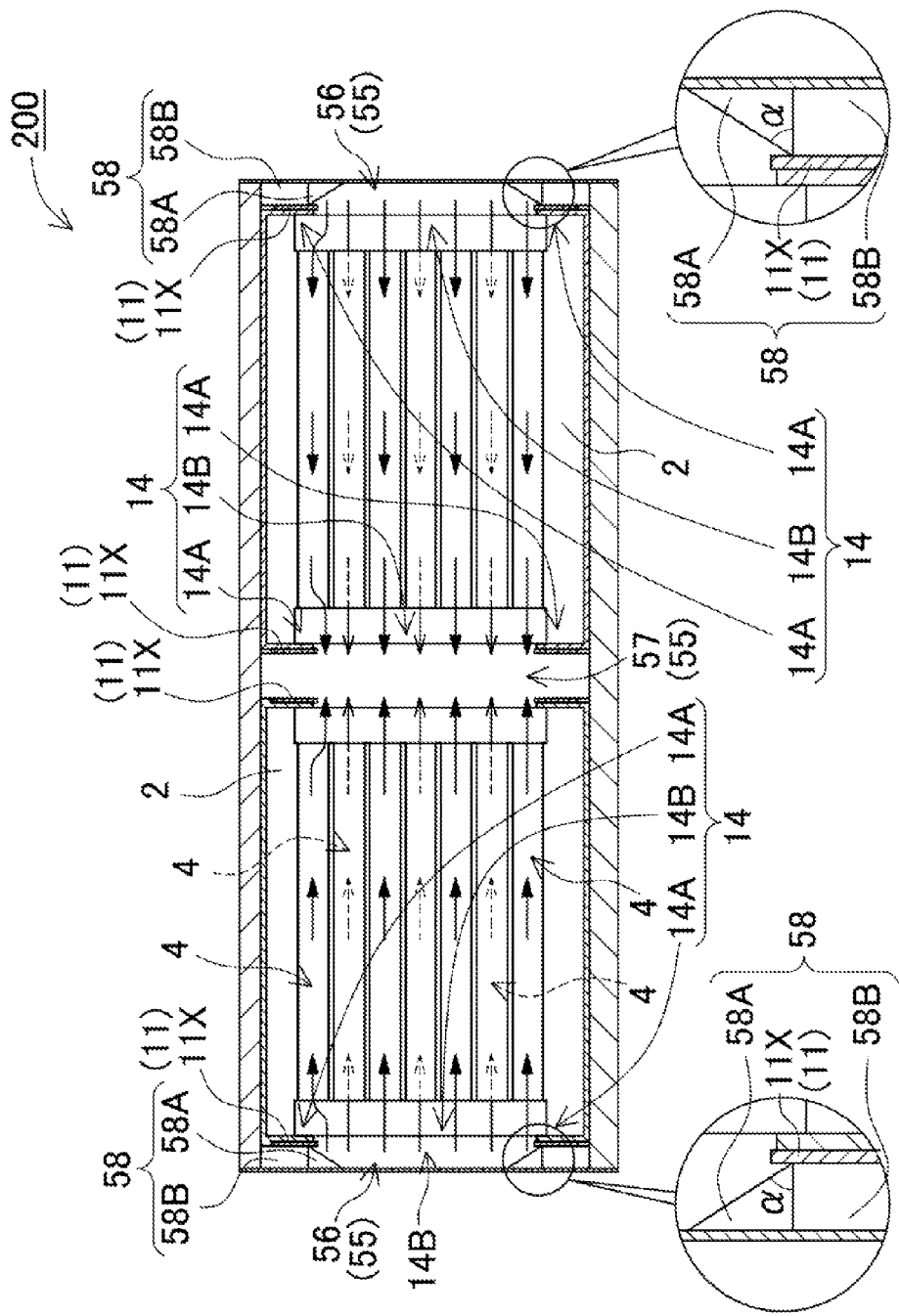
FIG. 12 is a cross-sectional view of the battery system shown in FIG. 11 taken along a line XII-XII with a part of the battery system being enlarged.
Figure 13:
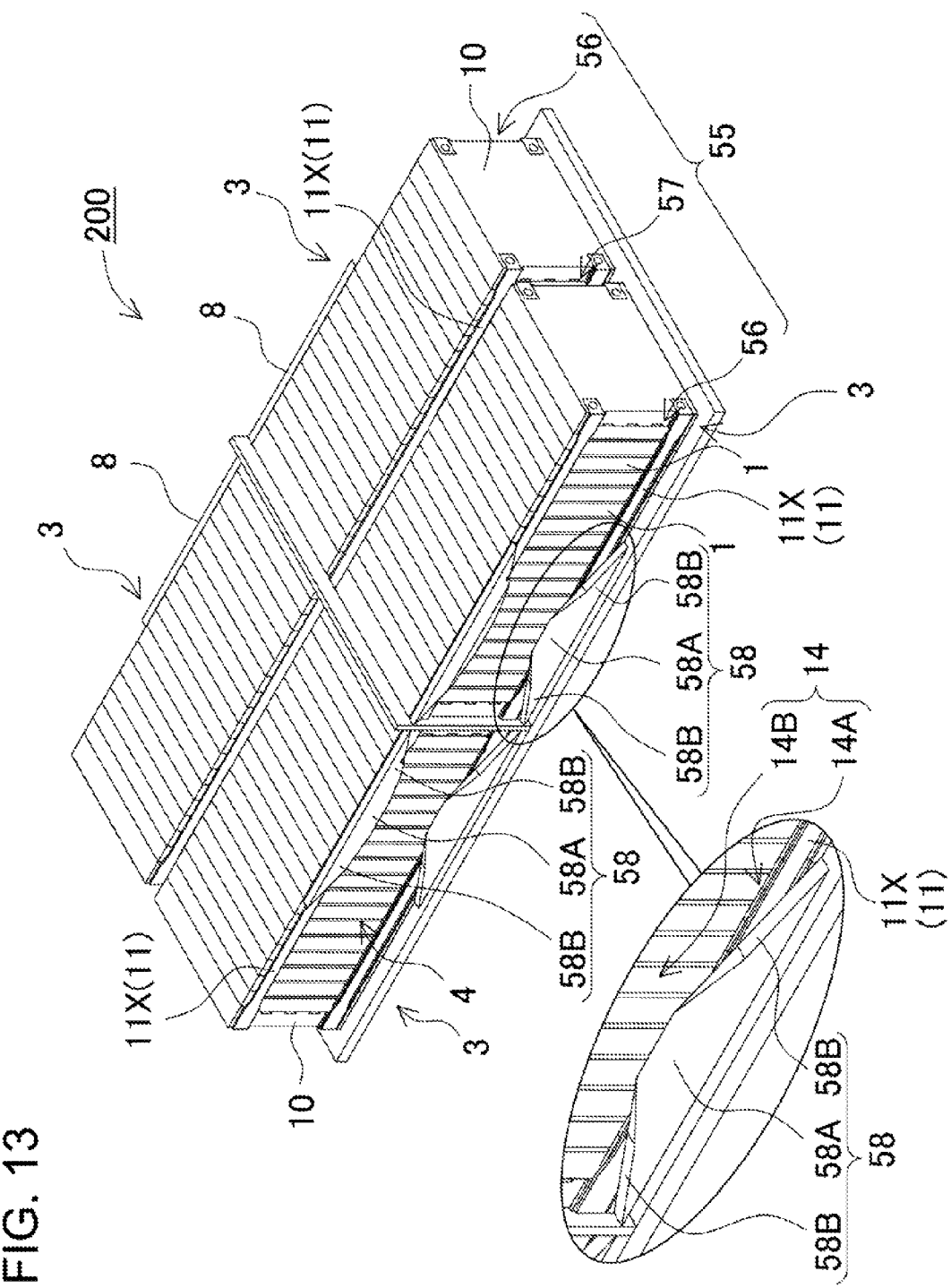
FIG. 13 is a perspective view schematically showing the internal structure of the battery system shown in FIG. 10 with a part of the battery system being enlarged.
Figure 14:
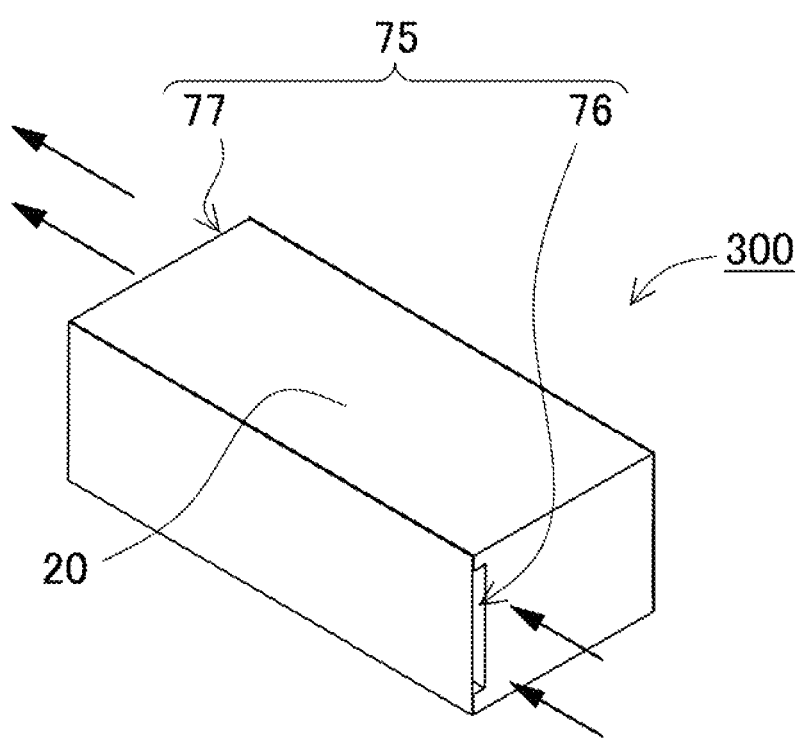
FIG. 14 is a perspective view schematically showing a battery system according to another embodiment of the present invention.
Figure 15:
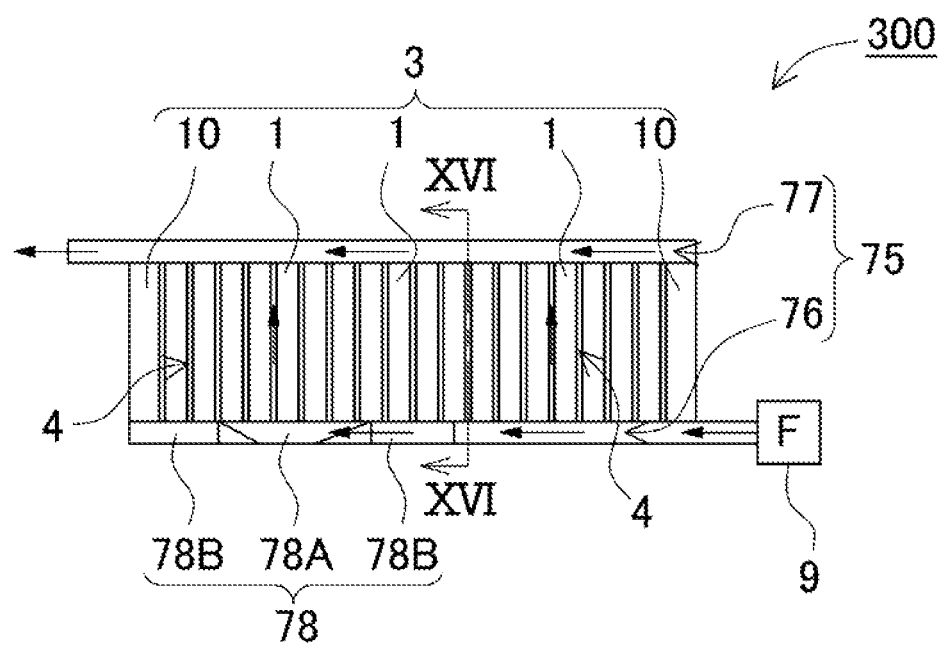
FIG. 15 is a horizontal cross-sectional view schematically showing the battery system shown in FIG. 14.
Figure 16:
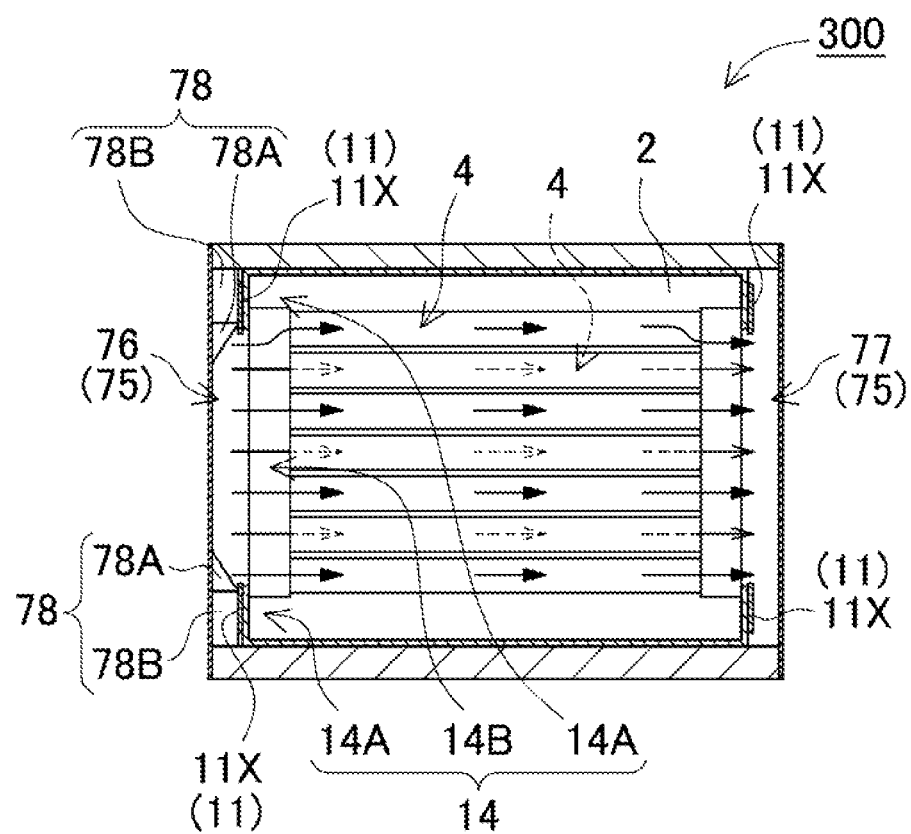
FIG. 16 is a cross-sectional view of the battery system shown in FIG. 15 taken along a line XVI-XVI with a part of the battery system being enlarged.
Figure 17:
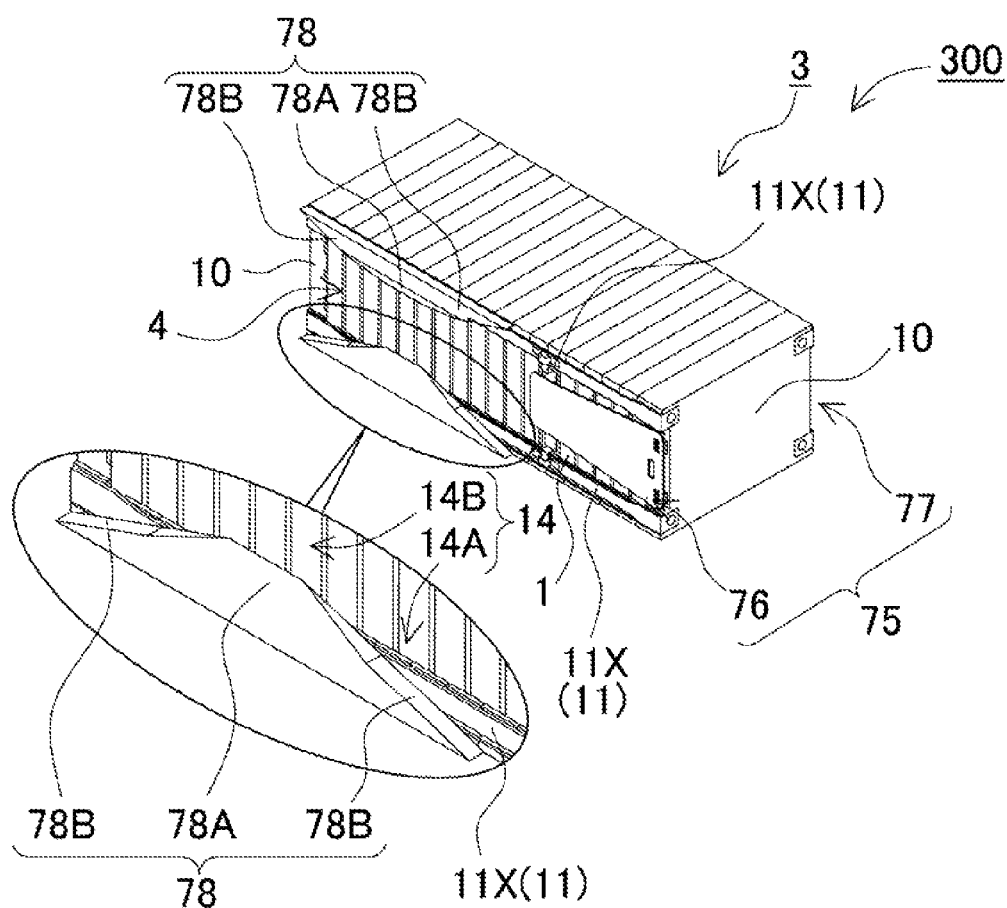
FIG. 17 is a perspective view schematically showing the internal structure of the battery system shown in FIG. 14 with a part of the battery system being enlarged.

In addition, the temperature equalizing walls 8, 58 and 78 shown in FIGS. 5, 12 and 16 have tapered portions 8A, 58A and 78A the horizontal width of which gets smaller toward the top end edges of the temperature equalizing walls 8, 58 and 78. Thus, the interval between the temperature equalizing walls 8, 58 and 78 and the surface of the battery block 3 gets larger toward the top end edges of the temperature equalizing walls 8, 58 and 78. In the tapered portions 8A, 58A and 78A of the temperature equalizing walls 8, 58 and 78 at the lower position, the horizontal width gradually decreases toward the top side. Accordingly, the interval between the temperature equalizing walls 8, 58 and 78 and the surface of the battery block 3 gradually increases toward the top side. In the tapered portions 8A, 58A and 78A of the temperature equalizing walls 8, 58 and 78 at the upper position, the horizontal width gradually decreases toward the bottom side. Accordingly, the interval between the temperature equalizing walls 8, 58 and 78 and the surface of the battery block 3 gradually increases toward the bottom side. In the temperature equalizing walls 8, 58 and 78 shown in FIGS. 5, 7, 12, 13, 16 and 17, the tapered portions 8A, 58A and 78A are not entirely formed. The temperature equalizing walls 8, 58 and 78 include upper and lower parts of the tapered portions 8A, 58A and 78A, and wide portions 8B, 58B and 78B. The wide portions 8B, 58B and 78B are shaped without horizontal width variation or with their horizontal width being changed in the vertical direction at an inclination smaller than the tapered portions 8A, 58A and 78A. Thus, the wide portions 8B, 58B and 78B have vertical or nearly vertical side surfaces.

In the power supply device of FIGS. 5 to 7, the inlet duct 6 is arranged between the two rows of battery blocks 3. The temperature equalizing wall 8 is arranged in this inlet duct 6. For this reason, the both surfaces of the tapered portion 8A of the temperature equalizing wall 8 are inclined at the same inclination angle ($\alpha$). Thus, the intervals between the temperature equalizing wall 8, and the opposed surfaces of the battery blocks 3 are the same. The reason is that the battery cells 1 of the battery blocks 3 on the both sides can be evenly cooled. In the power supply device of FIGS. 12 and 13, the inlet ducts 56 are arranged outside the two rows of battery blocks 3. The temperature equalizing walls 58 are arranged in these inlet ducts 56. For this reason, the tapered portion 58A of the temperature equalizing wall 58 has an inclined surface as the inside surface facing the surface of the battery block 3, and a vertical surface as the outside surface. The inclination angles ($\alpha$) of the temperature equalizing walls 58 are the same that are opposed to each other and arranged in the inlet ducts 56 located on both the outsides of the two rows of the battery blocks 3. Thus, the intervals between the temperature equalizing walls 58 and the surfaces of the battery blocks 3 are symmetrical with respect to a line. The reason is that the battery cells 1 of the two columns of battery blocks 3 can be evenly cooled. Also, in the power supply device shown in FIGS. 16 and 17, the inlet duct 76 and the outlet duct 77 are opposed to each other and arranged on the both sides of the one row of battery blocks 3. The temperature equalizing walls 78 are arranged in the inlet duct 76 as one of the fan ducts 75. The tapered portion 78A of the temperature equalizing wall 78 has an inclined surface as the inside surface opposed to the surface of the battery block 3, and a vertical surface as the outside surface.

The inclination angle ($\alpha$) of the tapered portions 8A, 58A and 78A with respect to the horizontal plane can be obtained from the horizontal width of the wide portions 8B, 58B and 78B, and the height of the tapered portions 8A, 58A and 78A. The tapered portion can be high when inclination angle ($\alpha$) is large and the horizontal width of the wide portion is large. The tapered portion can be low when inclination angle ($\alpha$) is small and the horizontal width of the wide portion is small.

In the aforementioned temperature equalizing walls 8, 58 and 78, the length in the cooling gas flowing direction and the height of the tapered portions 8A, 58A and 78A are adjusted to values that can minimize the temperature difference among the battery cells 1. In the power supply devices shown in FIGS. 4, 11 and 15, the temperature of a battery cell arranged on the downstream side in the cooling gas flowing direction will be higher than a battery cell 1 on the upstream side. In the power supply devices shown FIGS. 4, 11, and 15, in order to reduce the temperature of the battery cell on the downstream side and to reduce the temperature difference among the battery cells 1, the temperature equalizing walls 8, 58 and 78 are arranged on the downstream side in the inlet ducts 6, 56, and 76. In the temperature equalizing walls 8, 58 and 78, the length of the cooling gas flowing direction and the height of the tapered portions 8A, 58A and 78A are adjusted so as to further reduce the temperature difference among a half of battery cells 1 that are arranged on the downstream side.

In a power supply device without the temperature equalizing wall, the temperature difference occurs between a half of the whole battery cells (i.e., nine battery cells) arranged on the upstream side and another half of the battery cells arranged on the downstream side. In particular, the temperature of the nine battery cells arranged on the downstream side will be high, and as a result the temperature difference will be also large. In battery cells 1 that are arranged on the inlet and outlet sides of the inlet ducts 6, 56 and 76, their temperatures will be lower. The reason is that the end plates 10 on the both sides cool these battery cells 1. In addition, since cool gas flows from the inlet side, the temperature of a battery cell arranged on the downstream side will be the highest. In nine battery cells that are arranged on the downstream side, the temperature of a fourteenth battery cell arranged in the center of the nine battery cells will be the highest. The temperature of the battery cells will get lower as closer to the upstream and downstream side relative to the battery cell arranged in the center of the downstream side battery cells. For example, in the case where the temperature of the battery cell arranged in the center of the downstream side battery cells rises to about 34° C., the temperature of the battery cell arranged to the both ends of the downstream side battery cells will be 30° C. or lower. In this case, the lowest temperature of a battery cell among battery cells on the upstream side will be 23° C.

In the illustrated power supply device, in order to more efficiently cool battery cells 1 arranged on the downstream side of the inlet ducts 6, 56 and 76, the temperature equalizing walls 8, 58 and 78 are arranged on the downstream side of the inlet ducts 6, 56 and 76. In the temperature equalizing walls 8, 58 and 78, the length of the cooling gas flowing direction and the height of the tapered portions 8A, 58A and 78A are adjusted so as to reduce the temperatures of, and the temperature difference among the battery cells 1 that are arranged on the downstream side. The temperature equalizing walls 8, 58 and 78 are arranged in the inlet ducts 6, 56 and 76, and allow forcedly-blown cooling gas to more efficiently flow into the cooling gaps 4 whereby reducing the temperature of a battery cell 1 that is likely to increase in temperature.

In the power supply devices shown in FIGS. 5 to 7, 12, 13, 16 and 17, the wide portions 8B, 58B and 78B of the temperature equalizing walls 8, 58 and 78 are arranged at positions facing the bind bars 11X of the battery block 3, while the tapered portions 8A, 58A, and 78A of the temperature equalizing walls 8, 58 and 78 are arranged at positions facing the exposed portion 14B of the battery block 3. That is, the wide portions 8B, 58B and 78B are arranged outside the closed portions 14A of the battery block 3, while the tapered portions 8A, 58A and 78A are arranged outside the exposed portion 14B. In the power supply device shown in FIG. 5, the wide portion 8B of the temperature equalizing wall 8 is arranged between the bind bars 11X of the battery blocks 3 arranged in two rows, while the tapered portion 8B of the temperature equalizing wall 8 is arranged between the exposed portions 14B of the two rows of the battery block 3.

In the closed portion 14A, since openings 14 is closed by the bind bars 11X, even if cooling gas flows outside the closed portion 14A, the cooling gas cannot flow into cooling gaps 4 in the closed portion 14A. In the power supply devices shown in the cross-sectional views of FIGS. 5, 11 and 16, the wide portions 8B, 58B and 78B of the temperature equalizing walls 8, 58 and 78 arranged on the downstream side are arranged without a gap between the wide portion 8B, 58B or 78B and the bind bar 11X of the coupling member 11, or close to the bind bar. On the downstream side of the battery block 3 in the thus-configured power supply device, cooling gas does not flow outside the closed portions 14A closed by the bind bars 11X, while all the flowing cooling gas flows in the exposed portion 14B of the battery block 3 and can smoothly and efficiently flows from the exposed portion 14B into cooling gaps 4 so that battery cells 1 are efficiently cooled.

In addition, the tapered portions 8A, 58A and 78A protrude toward the exposed portion 14B. The vertical width of the tapered portions 8A, 58A and 78A are large in an area in that the battery temperature is likely to be high. Thus, the tapered portions 8A, 58A and 78A are arranged facing the exposed portion 14B. Accordingly, cooling gas blown into the inlet ducts 6, 56 and 76 flows between the tapered portions 8A, 58A and 78A and the exposed portion 14B, and is accelerated by the tapered portions 8A, 58A and 78A. In addition, the cooling gas is smoothly guided into cooling gaps 4 by the tapered portions 8A, 58A and 78A. As a result, battery cells 1 are efficiently cooled. Accordingly, in the temperature equalizing walls 8, 58 and 78, since a part of the tapered portions 8A, 58A and 78A with the largest vertical width is arranged in an area where battery cells 1 are likely to increase in temperature to the highest, it is possible to more efficiently cool battery cells that are likely to increase in temperature as compared with other battery cells. Therefore, it is possible reduce the battery temperature of battery cells that are likely to increase in temperature. According to the temperature equalizing walls 8, 58 and 78, the vertical width of the tapered portions 8A, 58A and 78A can adjust the efficiency of cooling a battery cell that is more likely to increase in temperature higher, while the length in the cooling gas flowing direction of the tapered portions 8A, 58A and 78A can define battery cells to be more efficiently cooled. In the power supply devices shown in FIGS. 4 to 7, 11 to 13, and 15 to 17, in order to more efficiently cool battery cells on the downstream side, the temperature equalizing walls 8, 58 and 78 are arranged on the downstream side in the inlet ducts 6, 56 and 76. In addition, the height of the tapered portions 8A, 58A and 78A is increased in an area where battery cells among the battery cells on the downstream side are likely to increase in temperature higher. As discussed above, the length of the temperature equalizing walls 8, 58 and 78 can adjust the number of battery cells to be efficiently cooled. Also, the vertical width of the temperature equalizing walls 8, 58 and 78 can adjust the efficiency of cooling a battery cell that is likely to increase in temperature higher. The temperature equalizing walls 8, 58 and 78 are arranged in an area where battery cells are likely to increase in temperature higher if the temperature equalizing walls 8, 58 and 78 are not provided. The height of the tapered portions 8A, 58A and 78A can adjust the maximum temperature of a battery cell that is likely to increase in the temperature to the highest to a certain lowered temperature. Thus, the temperature difference in the power supply device can be minimized.

In the aforementioned power supply device, the battery blocks 3 are secured in place to an exterior case 20. In the power supply device shown in FIGS. 1 and 2, the exterior case 20 is composed of a lower case 20A and an upper case 20B. The upper case 20B and the lower case 20A have flange portions 21 that protrude outward. The flange portions 21 are secured to each other by bolts 24 and nuts 25. In the illustrated exterior case 20, the flange portions 21 are arranged on the battery block 3 side surfaces. However, the flange portion may be arranged on the upper or lower part of the battery block, or at the center between the upper and lower parts. In this exterior case 20, the end plates 10 are secured to the lower case 20A by fastening screws (not shown) so that the battery blocks 3 are secured. The fastening screws are passed through the lower case 20A, and are screwed into threaded holes (not shown) of the end plates 10 so that the battery blocks 3 are secured to the exterior case 20. The heads of the fastening screws protrude from the lower case 20A. The battery blocks 3 are secured to the interior surface of the exterior case 20 shown in FIGS. 1 and 2. The fan ducts 5 are formed between the battery block 3 outside surfaces, and the interior surfaces of side walls 22 of the exterior case 20.

Also, end surface plates 30 are attached to the exterior case 20. The end surface plate 30 is formed of plastic or the like integrally with a connection duct 31 that is connected to the fan ducts 5 composed of the inlet and outlet ducts 6 and 7 when the end surface plate 30 is coupled to the battery blocks 3. The connection duct 31 protrudes outward. The connection duct 31 is connected to the blower mechanism 9, or to an exhaust duct (not shown), which exhausts cooling gas from the power supply device. Although not illustrated, the end surface plate is coupled to the end plate of the battery blocks by an interlocking structure. However, the end surface plate may be coupled to the battery blocks or the exterior case by a coupling structure other than the interlocking structure.

(Metal End Plate 10)

Figure 26:
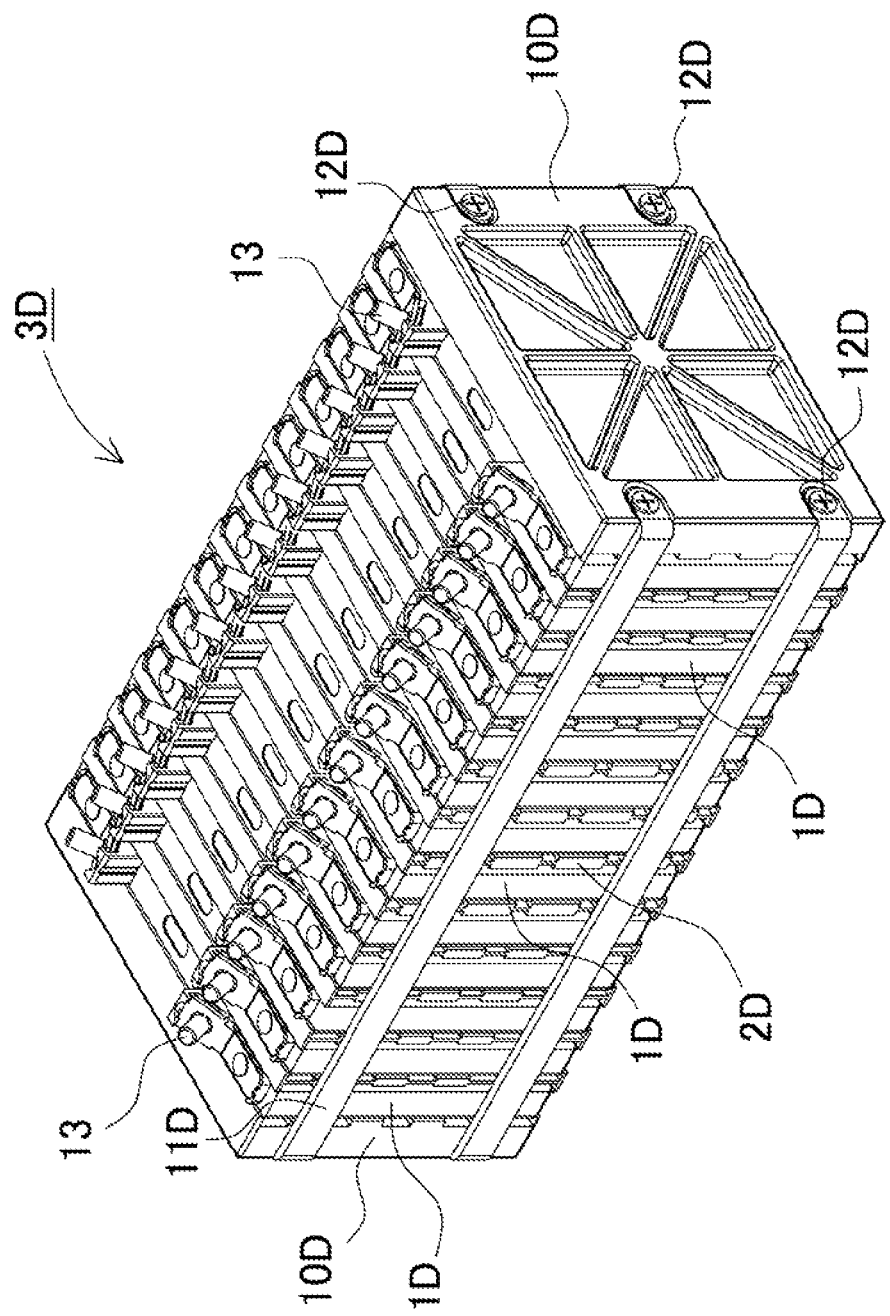
FIG. 26 is a perspective view showing the battery block that is secured by the bind bars.

In power supply devices, end plates made of resin are generally used from viewpoint of ease of forming, high insulating properties, and the like. In addition, in battery blocks, in order to arrange battery cells and separators side by side, coupling members have been used to couple the end plates to each other. For example, as shown in FIG. 26, the bind bars 11D are used as the coupling member to secure a battery block 3D by screwing fastening screws 12D into the end plates 10D. The both ends of the bind bar 110 are bent in a rectangular U shape, and are secured onto the end plates 10D. The battery block 3D is composed of battery cells 10 and separators 2D that are alternately arranged side by side. Threaded holes are formed in the end plate 100 to receive the fastening screws. For example, threaded holes are directly formed in the end plate 10D made of the resin, or internally-threaded cylindrical metal members are inserted into the end plate 10D by insert molding.

However, in either case, when strong fastening torque is applied to the fastening screw 12D to be screwed into the end plate 10D made of the resin, the part for receiving the fastening screw 12D may be damaged. When the battery block is securely constructed, the part for receiving the fastening screw is required to have sufficient strength to reliably bring battery cells in contact with the separators. In particular, the vehicle application requires high reliability such as vibration resistance and shock resistance. For this reason, torque for fastening the fastening screw will be specified high. However, end plates made of resin may be insufficient in strength. From this viewpoint, it is conceivable that metal end plates with higher rigidity are used instead of end plates made of resin are replaced with. In the case of metal end plates, screws can be sufficiently strongly screwed into threaded holes that are directly formed in the metal end plates.

However, metal end plates have thermal conductivity higher than resin. As a result, there is a problem in that the temperature of a battery cell adjacent to the metal end plates will be low. Even in the case of typical end plates made of resin, a battery cell on the end among battery cells is likely to be cooled more than other battery cells. In the case of metal end plates, the temperature difference between the battery cell on the end and other battery cells will be more remarkable. When battery cells are cooled, in addition to sufficient cooling performance, it is important to keep the temperatures of a plurality of battery cells even, in other words, to suppress the temperature difference among the battery cells. If the temperature difference is large among the battery cells, the battery capacity difference and the like will arise among the battery cells. Battery cells may be over-charged/over-discharged due to such difference. As a result, it can be expected that the battery cells deteriorate faster. For this reason, such large temperature difference is undesirable.

The inventors of the present invention have diligently studied, and as a result have found that, rather than cooling gas, the heat conduction of metal end plates causes larger temperature reduction of a battery cell located on the end than other battery cells. In order to suppress the heat conduction between a metal end plate and this battery cell, an end spacer is sandwiched between the metal end plate and this battery cell, and thermally-insulating layers are formed on the end spacer. Thus, we successfully suppress this heat conduction. The following description will describe the end spacer in more detail.

(End Spacer 17)

FIGS. 19 and 20 are the perspective views showing the end spacer 17. FIG. 21 is the perspective view showing the end spacer 17 and the end plate 10 to be engaged with the end spacer 17. The illustrated end spacer 17 has substantially the same external shape as the separator 2 shown in FIG. 9, and is formed of an insulating material such as resin similar to the separator 2 shown in FIG. 9. The end spacer is constructed similarly to the separator 2 except that the thermally-insulating layers 18 are formed. The thermally-insulating layers 18 can be formed by closing the ends of some of the cooling gaps through which cooling gas flows. The closed end can prevent that cooling gas flows through the closed cooling gap. Accordingly, air is confined in the closed cooling gap. Thus, the closed cooling gap serves as a thermally-insulating layer. In the exemplary end spacer shown in FIGS. 19 and 20, a center cooling gap 4 is not closed, and the ends of the cooling gaps adjacent to the unclosed center cooling gap 4 are closed so that two thermally-insulating layers 18 are formed. Only the center cooling gap 4 is not closed among three cooling gaps 4 shown in FIG. 19. The cooling gaps adjacent to the unclosed center cooling gap 4 are closed by the shape of an end surface of the end plate 10, when the end spacer is engaged with the end plate 10 as shown in FIG. 21.

Each of the thermally-insulating layers 18 defines a closed chamber into which air cannot flow. Accordingly, air with high thermally-insulating effect can be interposed between the battery cell 1 and the end plate 10, and can be held in the closed chamber with air being prevented from flowing into the closed chamber. Therefore, it is possible to further improve the thermally-insulating properties of the end spacer as compared with a resin material that can be used for a resin end plate. Note that it is not necessary to airtightly seal the closed chamber. It is enough for the closed chamber to prevent that air flows into the closed chamber too much.

In addition, the closed chamber defined by the thermally-insulating layer 18 is divided into a plurality chamber parts by ribs. Accordingly, an air flow is further suppressed. In addition, the ribs can improve the mechanical strength of the end spacer 17. Since this end spacer can have a remarkably different appearance from the separator, it is possible to reduce a mix-up between the end spacer and the separator in assembling. In the exemplary end spacer shown in FIG. 19, the ribs can be formed in a zigzag shape in section that is composed of continuous linear V shapes. The ribs are accommodated in a sawtooth waveform. Thus, the simply-formed ribs can be easily constructed. In addition, inclined ribs can improve the flexural strength of the end spacer 17.

Since the thermally-insulating layer is formed in a hollow layer, it is possible to improve the thermally-insulating properties of the thermally-insulating layer as compared with a solid thermally-insulating layer formed of a cooling gap that is completely filled with resin. Generally, the thermal conductivity of air is lower than the thermal conductivity of resin. For this reason, the heat insulation effect by air is high. In the case where a cooling gap is filled with resin, formation accuracy will deteriorate due to contraction (so-called "sink") of resin in curing after resin molding. The hollow thermally-insulating layer can solve this problem, and additionally can reduce the amount of resin to be used whereby contributing cost reduction and weight reduction. Accordingly, since the end plates 10 are made of metal, mechanical coupling force by the end plates 10 can be improved, and the thermal conductivity of the end plates 10 can be high. In addition, thermally-insulating layers 18, which define the closed chamber, can prevent that a battery cell that faces the end plate 10 is cooled at higher cooling performance than other battery cells. Thus, it is possible to improve the mechanical strength of the power supply device, and to evenly cool the battery cells.

Although the end spacer 17 may have only the thermally-insulating layers 18, the end spacer 17 preferably has the unclosed cooling gap 4 as discussed above. In this case, a battery cell 1 can be cooled that is in contact with the end spacer 17. In addition, since the unclosed cooling gap 4 is arranged in the center in the height direction of the end spacer 17, this battery cell 1 can be cooled from substantially the center. Therefore, it is possible to cool this battery cell 1 evenly in the height direction.

(Adjacent Separator)

Also, the thermally-insulating layers 18B can be formed in the separator. The thermally-insulating layers 18B are not formed in all of the separators, but it is preferable that the thermally-insulating layers be formed in some of the separators, more specifically, in a separator in contact with a battery cell that is likely to decrease in temperature lower than other battery cells. Generally, in the temperature distribution of the battery cells, the temperature of battery cells on the sides near the inlet and outlet sides of cooling gas is likely to be relatively lower, while the temperature of battery cells arranged inside is likely to be relatively higher. For this reason, the number of cooling gaps is reduced in a separator in contact with a battery cell is likely to decrease in temperature lower. Alternatively, the thermally-insulating layer is added in this separator. Thus, the temperature of this battery cell can be relatively higher. Therefore, it is possible to reduce the temperature difference $\Delta T$ among the battery cells.

In the exemplary battery block shown in the cross-sectional view of FIG. 22, the thermally-insulating layers are indicated by dashed line circles. In this battery block, a battery cell 1 on the end side in contact with the end spacer 17, and a separator 2a arranged between the end-surface-side battery cell 1 and a battery cell 1 inside the end-surface-side battery cell 1 have substantially the same shape as the end spacer 17. That is, central three cooling gaps 4 are unclosed, while the ends of two cooling gaps outside the three unclosed cooling gaps 4 are closed to form thermally-insulating layers 18B. In the end spacer 17, only one center cooling gap 4 is unclosed, while cooling gaps on the both sides of this unclosed center cooling gap are closed by the end plate 10. In the separator 2a, cooling gaps on the both sides of the center cooling gap are not closed so that three cooling gaps 4 are unclosed. Accordingly, the battery cell 1 cooling performance of the separator 2a is increased as compared with the end spacer 17. Therefore, it is possible to effectively cool the end-surface-side battery cell 1 and the battery cell 1 inside the end-surface-side battery cell 1.

In a separator 2b located inside the separator 2a, four cooling gaps 4 are unclosed, while the other cooling gaps are closed to form the thermally-insulating layers 18B. In a separator 2c located inside the separator 2b, five cooling gaps 4 are unclosed. In a separator 2d located inside the separator 2c, all of cooling gaps 4 are unclosed so that no thermally-insulating layer exists. Thus, the total cross-sectional area of the cooling gaps is the smallest on the end sides of the battery block, and gradually increases toward the inside of the battery block. In other words, the number of cooling gaps is gradually increased from the end side of the battery block, or the number of the thermally-insulating layers of the separator is gradually reduced. Thus, the cooling performance is gradually reduced for cooling battery cells that are likely to being getting cooled more effectively toward the end surface. As a result, the temperature of the battery cell on the end side is relatively increased. Therefore, it is possible to even the temperatures of the battery cells as a whole.

Examples

As stated above, cooling gas flows through the cooling gaps so that the battery cells are cooled, while the cooling effect is suppressed by the thermally-insulating layers in the battery cells on the end sides. Thus, the cooling performance difference is reduced. Therefore, it is possible to bring the temperatures of the battery cells closer to the same temperature. In addition, in the case where the aforementioned temperature equalizing walls and temperature equalizing plates are combined with the end spacers, it is possible to further even the temperatures of the battery cells.

The aforementioned power supply devices can be used as a battery system for vehicles. The power supply device can be installed on electric vehicles such as hybrid cars that are driven by both an engine and a motor, and electric vehicles that are driven only by a motor. The power supply device can be used as a power supply device for these types of vehicles.

Figure 23:
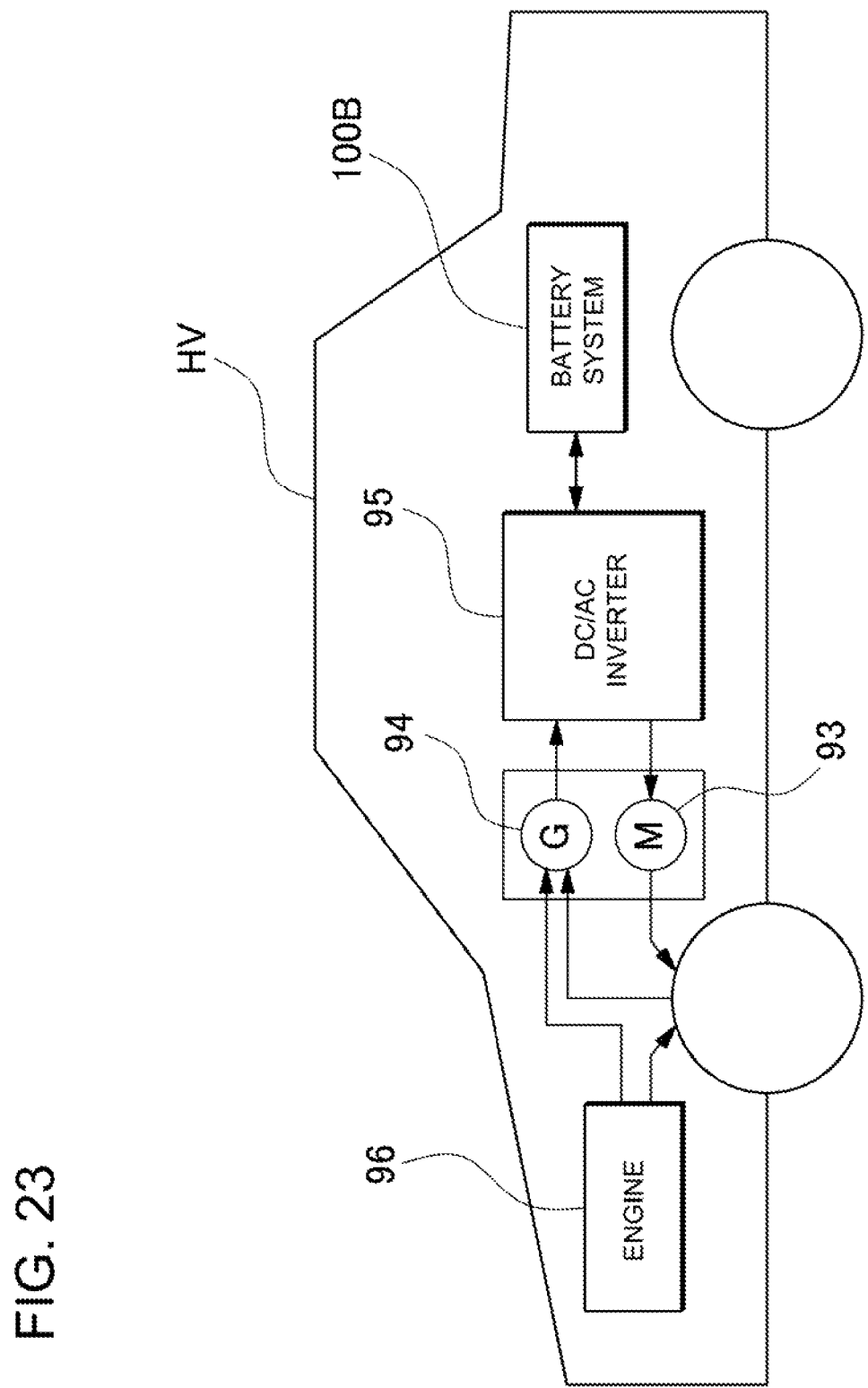
FIG. 23 is a block diagram showing an exemplary hybrid car that is driven by an engine and an electric motor, and includes the power supply device.

FIG. 23 is a block diagram showing an exemplary hybrid that is driven both by an engine and an electric motor, and includes the power supply device. The illustrated vehicle HV with the power supply device includes an electric motor 93 and an engine 96 that drive the vehicle HV, a battery system 100B that supplies electric power to the electric motor 93, and an electric generator 94 that charges batteries of the battery system 100B. The battery system 100B is connected to the electric motor 93 and the electric generator 94 via a DC/AC inverter 95. The vehicle HV is driven both by the electric motor 93 and the engine 96 with the batteries of the battery system 100E being charged/discharged. The electric motor 93 is energized and drives the vehicle in a poor engine efficiency range, e.g., in acceleration or in a low speed range. The electric motor 93 is energized by electric power is supplied from the battery system 100B. The electric generator 94 is driven by the engine 96 or by regenerative braking when users brake the vehicle so that the batteries of the battery system 100B are charged.

Figure 24:
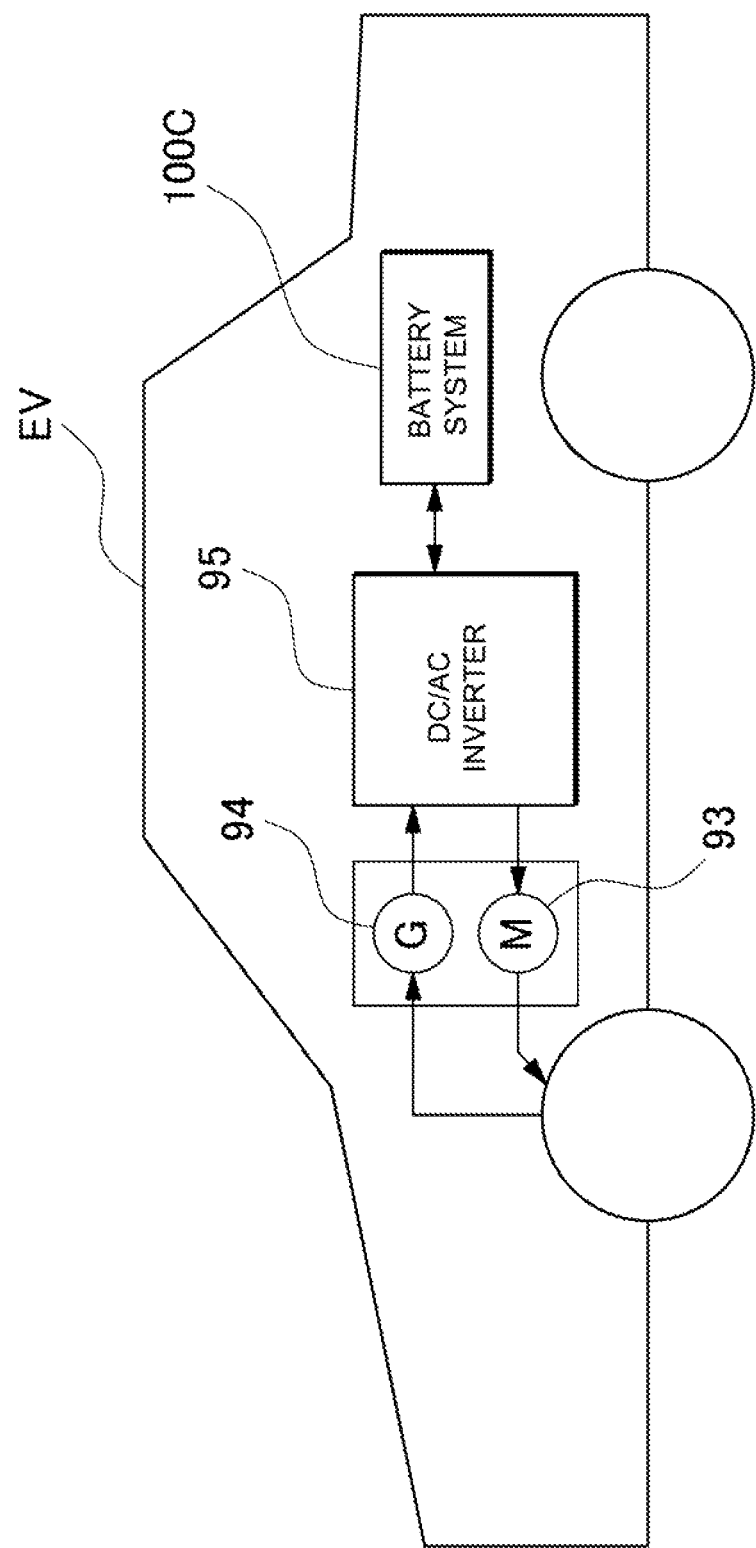
FIG. 24 is a block diagram showing an exemplary electric vehicle that is driven only by an electric motor, and includes the power supply device.
Figure 25:
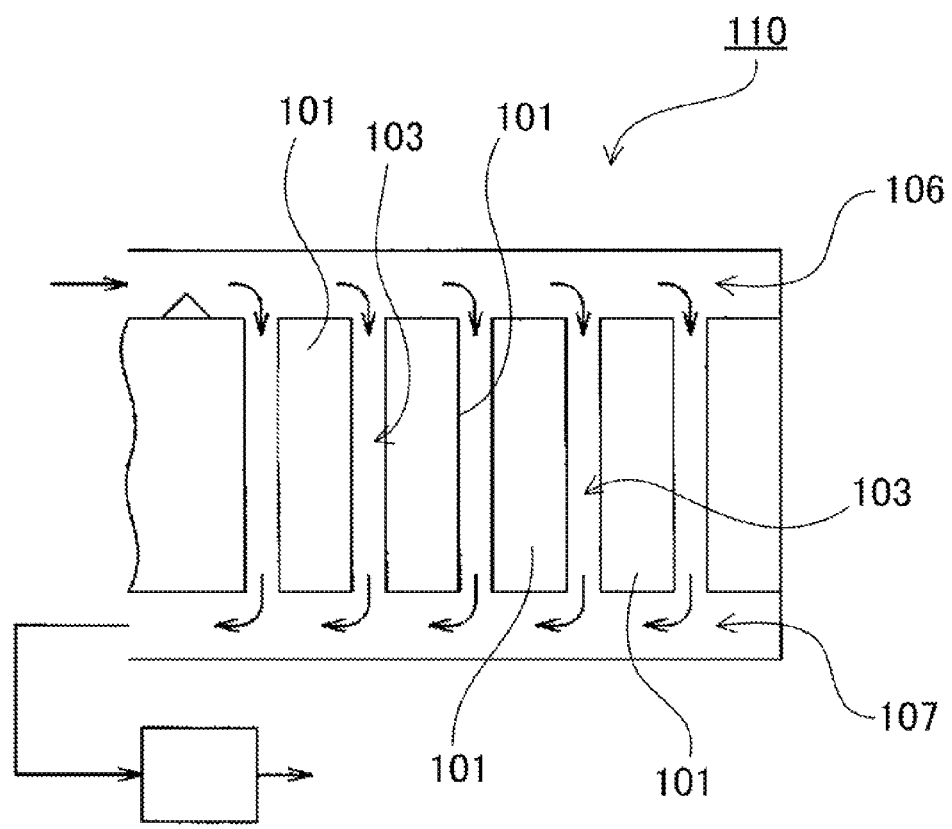
FIG. 25 is a horizontal cross-sectional view showing a known power supply device.

FIG. 24 shows an exemplary electric vehicle that is driven only by an electric motor, and includes the power supply device. The illustrated vehicle EV with the power supply device includes an electric motor 93 that drive the vehicle EV, a battery system 100C that supplies electric power to the electric motor 93, and an electric generator 94 that charges batteries of the battery system 100C. The electric motor 93 is energized by electric power is supplied from the battery system 100C. The electric generator 94 can be driven by vehicle EV regenerative braking so that the batteries of the battery system 100C are charged.

INDUSTRIAL APPLICABILITY

A vehicle power supply device and a capacity evening method of a power supply device according to the present invention can be suitably applied to a capacity evening method of plug-in hybrid vehicles and hybrid electric vehicles that can switch between the EV drive mode and the HEV drive mode, electric vehicles, and the like.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2009-250030 filed in Japan on Oct. 30, 2009, the content of which is incorporated herein by reference.

What is claimed is:

1. A power device comprising:
a plurality of rectangular battery cells, the battery cells including end battery cells;
separators that are made of resin, the separators and battery cells being alternately stacked side by side to form a battery block with the end battery cells being disposed on ends of the battery block, the separators being interposed between the battery cells and in thermal contact with the surfaces of adjacent battery cells, and the separators electrically insulating the adjacent battery cells from each other,
a pair of end spacers that cover the end battery cells;
a pair of metal end plates that cover surfaces of said end spacers and are thicker than said end spacers; and
coupling members that couple said pair of end plates to each other,
wherein cooling gaps are defined in the separators on the sides of the separators which contact the adjacent battery cells, each of the cooling gaps facing one of the battery cells and being adapted to pass cooling gas over a surface of said one of the battery cells,
wherein a hollow thermally-insulating layer is formed in each of the end spacers on a side of the end spacer which contacts the respective end battery cell, each of the hollow thermally-insulating layers forming a closed chamber with a hollow space inside, the hollow space being isolated from outside of the closed chamber so that inside air in the hollow space of the closed chamber is confined and prevented from being ventilated with outside air,
wherein the separators further comprise hollow thermally-insulating layers, each of the hollow thermally-insulating layers forming a closed chamber with a hollow space inside, the hollow space being isolated from outside of the closed chamber so that inside air in the hollow space of the closed chamber is confined and prevented from being ventilated with outside air, and
wherein an opening volume of the cooling gaps in the separators varies in a stacking direction of the battery block.

2. The power supply device according to claim 1,
wherein each of the separators has a groove with open ends, the groove forms one of the cooling gaps, and each of the separators has a cross section which includes a rectangular or trapezoidal wave shape that forms the groove,
wherein each of the end spacers has a projection with closed ends and the hollow space inside, the projection forms one of the hollow thermally-insulating layers, and each of the end spacers has a cross section with a rectangular or trapezoidal wave shape that forms the projection.

3. The power supply device according to claim 1, wherein the closed chamber of at least one of the thermally-insulating layers is divided into a plurality of chamber parts by ribs.

4. The power supply device according to claim 3, wherein said ribs are formed in continuous V shapes in section.

5. A power device comprising:
a plurality of rectangular battery cells, the battery cells including end battery cells;
separators that are made of resin, the separators and battery cells being alternately stacked side by side to form a battery block with the end battery cells being disposed on ends of the battery block, the separators being interposed between the battery cells and in thermal contact with the surfaces of adjacent battery cells, and the separators electrically insulating the adjacent battery cells from each other,
a pair of end spacers that cover the end battery cells;
a pair of metal end plates that cover surfaces of said end spacers and are thicker than said end spacers; and
coupling members that couple said pair of end plates to each other,
wherein cooling gaps are defined in the separators on the sides of the separators which contact the adjacent battery cells, each of the cooling gaps facing one of the battery cells and being adapted to pass cooling gas over a surface of said one of the battery cells,
wherein a hollow thermally-insulating layer is formed in each of the end spacers on a side of the end spacer which contacts the respective end battery cell, each of the hollow thermally-insulating layers forming a closed chamber with a hollow space inside, the hollow space being isolated from outside of the closed chamber so that inside air in the hollow space of the closed chamber is confined and prevented from being ventilated with outside air,
wherein said end spacers include cooling gaps on sides of the end spacers which contact the battery cells, each of the cooling gaps facing one of the battery cells and being adapted to pass cooling gas over a surface of said one of the battery cells, and
wherein the number of the cooling gaps in each of said separators is greater than the number of the cooling gaps in each of said end spacers.

6. A power device comprising:
a plurality of rectangular battery cells, the battery cells including end battery cells;
separators that are made of resin, the separators and battery cells being alternately stacked side by side to form a battery block with the end battery cells being disposed on ends of the battery block, the separators being interposed between the battery cells and in thermal contact with the surfaces of adjacent battery cells, and the separators electrically insulating the adjacent battery cells from each other,
a pair of end spacers that cover the end battery cells;
a pair of metal end plates that cover surfaces of said end spacers and are thicker than said end spacers; and
coupling members that couple said pair of end plates to each other,
wherein cooling gaps are defined in the separators on the sides of the separators which contact the adjacent battery cells, each of the cooling gaps facing one of the battery cells and being adapted to pass cooling gas over a surface of said one of the battery cells,
wherein a hollow thermally-insulating layer is formed in each of the end spacers on a side of the end spacer which contacts the respective end battery cell, each of the hollow thermally-insulating layers forming a closed chamber with a hollow space inside, the hollow space being isolated from outside of the closed chamber so that inside air in the hollow space of the closed chamber is confined and prevented from being ventilated with outside air,
wherein said end spacers include cooling gaps on sides of the end spacers which contact the battery cells, each of the cooling gaps facing one of the battery cells and being adapted to pass cooling gas over a surface of said one of the battery cells, and wherein the total cross-sectional area of flow paths of the cooling gaps in each of said separators is greater than the total cross-sectional area flow paths of the cooling gaps in each of said end spacers.

7. The power supply device according to claim 5, wherein one of the cooling gaps is disposed in each of the end spacers substantially at a center in a height direction of the end spacer, and wherein the thermally-insulating layers are arranged on both sides of this cooling gap.

8. The power supply device according to claim 6, wherein the separators that face said end spacers further comprise thermally-insulating layers, and each of the thermally-insulating layers form a closed chamber with a hollow space inside, the hollow space being isolated from outside of the closed chamber so that inside air in the hollow space of the closed chamber is confined and prevented from being ventilated with outside air.

9. The power supply device according to claim 1, wherein the cooling gaps located at the center of the battery block allow more coolant flow than the cooling gaps located at the end of the battery block.

10. The power supply device according to claim 1, further comprising a duct that can be connected to a blower mechanism to forcedly blow cooling gas into said cooling gaps.

11. The power supply device according to claim 1, wherein said coupling members are secured by screws.

12. The power supply device according to claim 1, wherein the end spacers have substantially the same external shape as the separators.

13. The power supply device according to claim 1, wherein the end spacers and the separators are made of an electrically insulating material.

14. The power supply device according to claim 13, wherein said end spacers are made of resin.

15. The power supply device according to claim 1, wherein the cooling gaps at both end sides of the battery block have the smallest opening volume.

16. The power supply device according to claim 1, further comprising a duct and a blower mechanism, wherein blower mechanism forcedly blows cooling gas through the duct and into said cooling gaps.

* * * * *